(12) United States Patent
Ward et al.

(10) Patent No.: US 6,909,743 B1
(45) Date of Patent: Jun. 21, 2005

(54) METHOD FOR GENERATING AND PROCESSING TRANSITION STREAMS

(75) Inventors: Christopher Ward, Glen Ridge, NJ (US); Robert Norman Hurst, Hopewell, NJ (US)

(73) Assignee: Sarnoff Corporation, Princeton, NJ (US)

( * ) Notice: Subject to any disclaimer, the term of this patent is extended or adjusted under 35 U.S.C. 154(b) by 777 days.

(21) Appl. No.: 09/430,631

(22) Filed: Oct. 29, 1999

Related U.S. Application Data

(63) Continuation-in-part of application No. 09/347,213, filed on Jul. 2, 1999.
(60) Provisional application No. 60/129,275, filed on Apr. 14, 1999.

(51) Int. Cl.[7] .............................................. H04B 1/66
(52) U.S. Cl. ........................ 375/240.01; 375/240.25; 375/240.26; 375/240.28; 375/240.01; 348/584; 348/473

(58) Field of Search .......................... 375/240, 240.01, 375/240.25, 240.26, 240.28; 348/722, 400, 402, 411, 415, 584, 473, 409, 419, 700

(56) References Cited

U.S. PATENT DOCUMENTS

| | | | | |
|---|---|---|---|---|
| 5,859,660 A | * | 1/1999 | Perkins et al. | 348/9 |
| 5,864,682 A | * | 1/1999 | Porter et al. | 348/13 |
| 5,917,830 A | * | 6/1999 | Chen et al. | 348/473 |
| 5,982,436 A | * | 11/1999 | Balakrishnan et al. | 348/409 |
| 6,038,000 A | * | 3/2000 | Hurst, Jr. | 348/845 |
| 6,104,441 A | * | 8/2000 | Wee et al. | 348/722 |
| 6,137,834 A | * | 10/2000 | Wine et al. | 375/240 |

* cited by examiner

*Primary Examiner*—Shawn S. An
(74) *Attorney, Agent, or Firm*—William J. Burke

(57) ABSTRACT

A method for generating a transition stream and processing video, audio or other data within the transition stream using, respectively, pixel domain processing, audio domain processing or other data domain processing.

26 Claims, 11 Drawing Sheets

(SMPTE TIME CODES)

| | | | | | |
|---|---|---|---|---|---|
| STREAM A | 00:00:00:00 | <$t_2$ | 00:00:02:13 | N/A | N/A |
| STREAM B | N/A | N/A | 00:00:00:23 | >$t_2$ | 00:00:04:17 |
| RESULTANT | 00:00:00:00 | <$t_2$ | 00:00:02:13 | >$t_2$ | 00:00:04:17 |
| | $t_0$ | $t_1$ | $t_2$ | $t_3$ | $t_4$ |

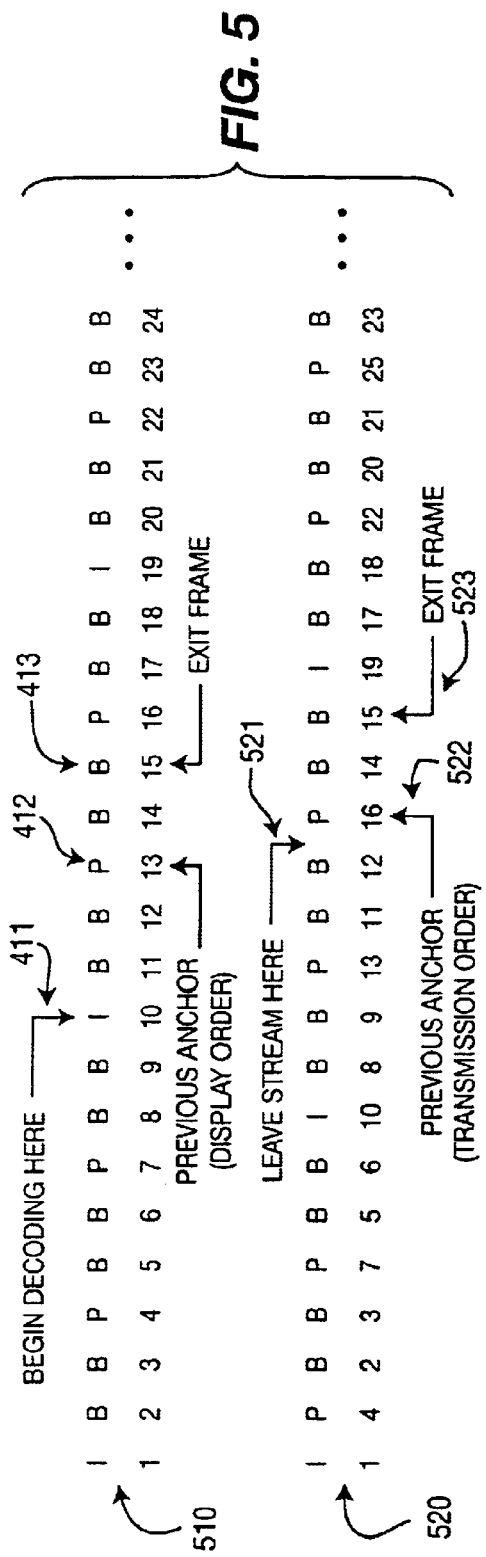
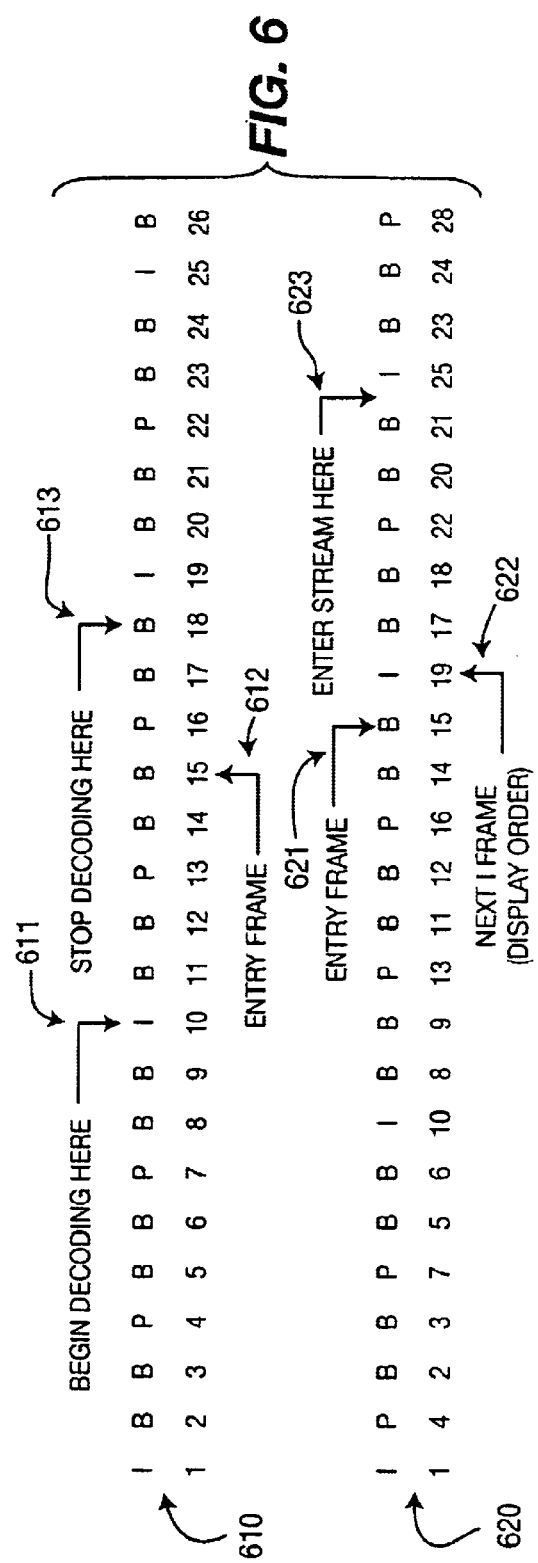
FIG. 5
FIG. 6

| # | s: | e: | fr: | PT: | DT: | Bd: | cBd: | |
|---|---|---|---|---|---|---|---|---|
| 1 | 29 | 878 | 0I | 25500 | 22500 | 250ms | 0ms | I O |
| 2 | 879 | 1213 | 3P | 34500 | 25500 | 217ms | 217ms | |
| 3 | 1214 | 1444 | 1B | 28500 | 0 | 225ms | 225ms | |
| 4 | 1445 | 1770 | 2B | 31500 | 0 | 240ms | 240ms | O |
| 5 | 1771 | 2355 | 6P | 43500 | 34500 | 248ms | 248ms | |
| 6 | 2356 | 2871 | 4B | 37500 | 0 | 236ms | 236ms | |
| 7 | 2872 | 3298 | 5B | 40500 | 0 | 229ms | 229ms | O |
| 8 | 3299 | 3840 | 9P | 52500 | 43500 | 230ms | 230ms | |
| 9 | 3841 | 4225 | 7B | 46500 | 0 | 221ms | 221ms | |
| 10 | 4226 | 4602 | 8B | 49500 | 0 | 224ms | 224ms | O |
| 11 | 4603 | 4942 | 12P | 61500 | 52500 | 228ms | 228ms | |
| 12 | 4943 | 5310 | 10B | 55500 | 0 | 235ms | 235ms | |
| 13 | 5311 | 5678 | 11B | 58500 | 0 | 240ms | 240ms | O |
| 14 | 5679 | 6497 | 13I | 64500 | 61500 | 245ms | 245ms | I O |
| 15 | 6498 | 6685 | 16P | 73500 | 64500 | 215ms | 215ms | |
| 16 | 6686 | 7014 | 14B | 67500 | 0 | 234ms | 234ms | |
| 17 | 7015 | 7365 | 15B | 70500 | 0 | 241ms | 241ms | O |
| 18 | 7366 | 7594 | 19P | 82500 | 73500 | 248ms | 248ms | |
| 19 | 7595 | 8045 | 17B | 76500 | 0 | 263ms | 263ms | |
| 20 | 8046 | 8540 | 18B | 79500 | 0 | 261ms | 261ms | O |
| 21 | 8541 | 8839 | 22P | 91500 | 82500 | 256ms | 256ms | |
| 22 | 8840 | 9347 | 20B | 85500 | 0 | 267ms | 267ms | |
| 23 | 9348 | 9841 | 21B | 88500 | 0 | 260ms | 260ms | O |
| 24 | 9842 | 10213 | 25P | 100500 | 91500 | 256ms | 256ms | |
| 25 | 10214 | 10704 | 23B | 94500 | 0 | 260ms | 260ms | |
| 26 | 10705 | 11196 | 24B | 97500 | 0 | 255ms | 255ms | O |
| 27 | 11197 | 12165 | 26I | 103500 | 100500 | 250ms | 250ms | I O |
| 28 | 12166 | 12536 | 29P | 112500 | 103500 | 208ms | 208ms | |
| 29 | 12537 | 12994 | 27B | 106500 | 0 | 213ms | 213ms | |
| 30 | 12995 | 13408 | 28B | 109500 | 0 | 211ms | 211ms | O |
| 31 | 13409 | 13750 | 32P | 121500 | 112500 | 212ms | 212ms | |
| 32 | 13751 | 14158 | 30B | 115500 | 0 | 219ms | 219ms | |
| 33 | 14159 | 14563 | 31B | 118500 | 0 | 221ms | 221ms | O |
| 34 | 14564 | 14886 | 35P | 130500 | 121500 | 222ms | 222ms | |
| 35 | 14887 | 15290 | 33B | 124500 | 0 | 231ms | 231ms | |
| 36 | 15291 | 15696 | 34B | 127500 | 0 | 233ms | 233ms | |
| 37 | 15697 | 15999 | 38P | 139500 | 130500 | 234ms | 234ms | |
| 38 | 16000 | 16403 | 36B | 133500 | 0 | 244ms | 244ms | |
| 39 | 16404 | 16802 | 37B | 136500 | 0 | 246ms | 246ms | O |
| 40 | 16803 | 17627 | 39I | 142500 | 139500 | 249ms | 249ms | I O |
| 41 | 17628 | 17916 | 42P | 151500 | 142500 | 218ms | 218ms | |
| 42 | 17917 | 18326 | 40B | 145500 | 0 | 229ms | 229ms | |
| 43 | 18327 | 18743 | 41B | 148500 | 0 | 230ms | 230ms | O |
| 44 | 18744 | 19066 | 45P | 160500 | 151500 | 231ms | 231ms | |
| 45 | 19067 | 19492 | 43B | 154500 | 0 | 240ms | 240ms | |
| 46 | 19493 | 19925 | 44B | 157500 | 0 | 240ms | 240ms | O |
| 47 | 19926 | 20246 | 48P | 169500 | 160500 | 240ms | 240ms | |
| 48 | 20247 | 20683 | 46B | 163500 | 0 | 248ms | 248ms | |
| 49 | 20684 | 21122 | 47B | 166500 | 0 | 248ms | 248ms | O |
| 50 | 21123 | 21454 | 51P | 178500 | 169500 | 247ms | 247ms | |
| 51 | 21455 | 21895 | 49B | 172500 | 0 | 255ms | 255ms | |
| 52 | 21896 | 22373 | 50B | 175500 | 0 | 254ms | 254ms | MO |
| 53 | 22375 | 23078 | 52I | 181500 | 178500 | 250ms | 250ms | I O |
| 54 | 23079 | 23416 | 55P | 190500 | 181500 | 229ms | 229ms | |

METHOD FOR GENERATING AND PROCESSING TRANSITION STREAMS

CROSS REFERENCE TO RELATED APPLICATIONS

This application is a continuation-in-part of U.S. patent application Ser. No. 09/347,213, filed Jul. 2, 1999 for FRAME-ACCURATE SEAMLESS SPLICING OF INFORMATION STREAMS which is incorporated herein by reference in its entirety. This application claims the benefit of U.S. provisional patent application Ser. No. 60/129,275, filed Apr. 14, 1999 and incorporated herein by reference in its entirety.

The invention relates to communications systems generally and, more particularly, the invention relates to a method for splicing or concatenating information streams in a substantially seamless manner.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

It is important to television studios and other "consumers" of information streams to be able to concatenate or splice between information streams (e.g., transport encoded program streams incorporating video, audio and other associated information sub-streams) in a substantially seamless and frame accurate manner. "Frame accurate" means that a splice occurs precisely at the frames selected by the user, regardless of the frame type of the encoded frame (e.g., I-, P- or B-frame encoding). "Seamless splice" means a splice which results in a continuous, valid MPEG stream. Thus, a frame accurate seamless splicer will preserve an exact number of frames when performing a frame accurate seamless splice of a first information stream into a second information stream (e.g., a transport encoded program comprising a 900 video frame commercial presentation may be scheduled into a "slot" of exactly 900 frames).

Several known methods utilize variations of the following procedure: decoding an "in stream" and an "out stream" to a baseband or elementary level, performing a splice operation and re-encoding the resulting spliced stream. These methods provide frame accurate seamless splices, but at great expense.

In an improved method allowing seamless splicing at the transport stream level, MPEG and MPEG-like information streams including, e.g., video information may be spliced together in a relatively seamless manner by defining "in-points" and "out-points" for each stream that are indicative of, respectively, appropriate stream entry and exit points. For example, a packet containing a video sequence header in an MPEG-like video stream comprises an appropriate in-point. An MPEG-like information stream that contains such in-points and out-points is said to be spliceable. The Society of Motion Picture and Television Engineers (SMPTE) has proposed a standard SMPTE 312M defining such splicing points entitled "Splice Points for MPEG-2 Transport Streams," which is incorporated herein by reference in its entirety.

Unfortunately, the placement of such In points and out-points is defined by factors such as image frame encoding mode, group of pictures (GOP) structure and the like. Therefore, an end user trying to seamlessly splice between information streams cannot do so in a "frame accurate" manner if the desired splicing points are not appropriate in-points or out-points.

Therefore, it is seen to be desirable to provide a method and apparatus that allows seamless, frame accurate splicing of MPEG-like transport streams. Moreover, it is seen to be desirable to provide a method and apparatus for applying such a seamless, frame accurate splicing method and apparatus to the particular environment of a television studio or other video serving environment.

SUMMARY OF THE INVENTION

The invention comprises a method for generating a transition stream and processing video, audio or other data within the transition stream using, respectively, pixel domain processing, audio domain processing or other data domain processing. Alternate embodiments of the invention ensure that non-video data related to image frames forming a transition stream are included within the transition stream. Multiple and single program transport streams splicing operations are supported by the invention.

Specifically, in a system for processing transport streams including image frames, a method according to the invention for generating a transition stream for transitioning from a first transport stream to a second transport stream in a substantially seamless manner comprises the steps of: decoding a portion of the first transport stream including at least a target out-frame representing a last image frame of the first transport stream to be presented; decoding a portion of the second transport stream including at least a target in-frame representing a first image frame of the second transport stream to be presented; processing, using a pixel domain process, at least one of the decoded image frames; and encoding a plurality of the decoded image frames, including the target out-frame and the target in-frame, to produce the transition stream.

BRIEF DESCRIPTION OF THE DRAWINGS

The teachings of the present invention can be readily understood by considering the following detailed description in conjunction with the accompanying drawings, in which:

FIGS. 5 and 6 depict tabular representations of image frame display order and image frame transmission orders useful in understanding the invention;

FIG. 11 depicts a tabular representation of a meta file suitable for use in the play to air server of FIG. 3.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any information processing system in which a need exists to perform seamless, frame accurate splicing of, e.g., MPEG-like transport streams including video sub-streams.

An embodiment of the invention will be described within the context of a television studio environment where a play to air controller causes stored video streams (e.g., video segments or "clips") to be retrieved from a server and spliced together in a seamless, frame accurate manner to produce, e.g., an MPEG-2 compliant video stream suitable for transporting to a far end decoder. However, since the scope and teachings of the invention have much broader applicability, the invention should not be construed as being limited to the disclosed embodiments. For example, the invention has applicability to server-based asset streaming for cable headends, insertion of local commercials and trailers for digital cinema, frame accurate Internet-based streaming of MPEG-2 transport streams and limited production facilities (i.e., those production facilities performing only the composition of segments for news or other applications).

Throughout this description various terms are used to describe the invention. Unless modified by the following description, the several of the terms are defined as follows: A spliced stream comprises a stream formed by concatenating an exit-stream (or from-stream) to an entry-stream (or to-stream) at a particular splicing point. An exit-frame is the last frame of an exit-stream. An entry frame is the first frame of an entry-stream.

Figure 1:
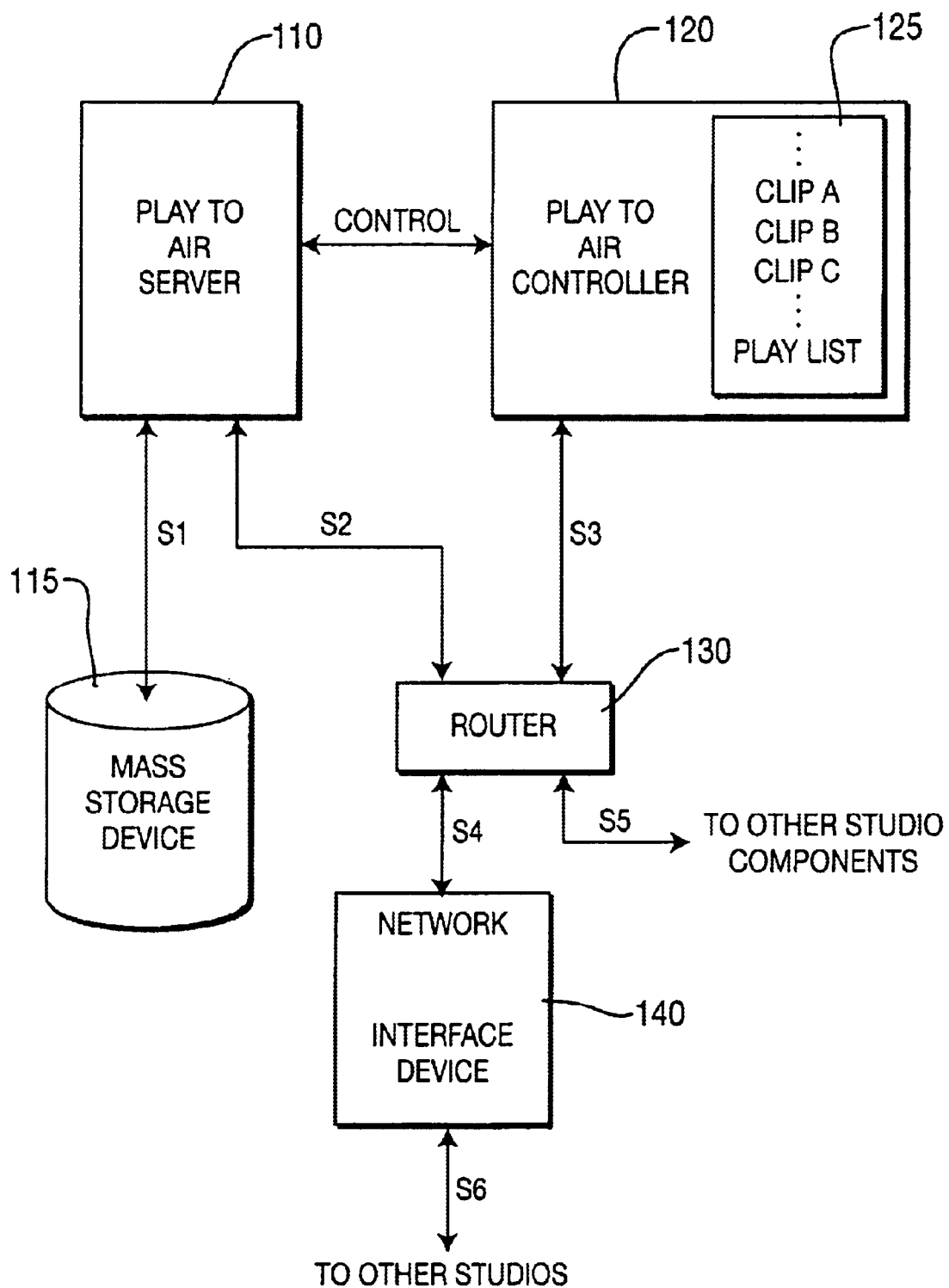
FIG. 1 depicts a high level block diagram of a television studio.

FIG. 1 depicts a high level block diagram of a television studio. Specifically, the studio of FIG. 1 comprises a play to air server 110, a mass storage device 115, a play to air controller 120, a router 130 and a network interface device (NID) 140.

The mass storage device 115 is used to store a plurality of, illustratively, MPEG-2 transport streams including encoded video sub-streams and associated audio streams providing a program. The mass storage device 115 may also be used other types of information streams, such as packetized or non-packetized elementary streams comprising video data, audio data, program information and other data.

The play to air server 110 retrieves, via signal path S1, information streams from the mass storage device 115. The retrieved information streams are processed, in response to a control signal produced by the play to air controller 120 (e.g., a play list) to produce an output transport stream comprising a plurality of concatenated transport streams. The play to air server 110 provides the output transport stream and is coupled to the router 130 via signal path S2.

The play to air controller 120 provides control information to the play to air server 110 and other studio equipment (not shown) via a signal path S3, which is coupled to the router 130. The router 130 is used to route all control and program information between the various functional elements of the television studio 100. For example, control information is passed from the play to air controller 120 via signal path S3 to the router 130, which then passes the control information to the play to air server 110 via signal path S2. Optionally, a direct control connection CONTOL between the play to air controller 120 and the play to air server 110 is used for passing control information.

The router 130 receives the output transport stream from the play to air server 110 via signal path S2 and responsively passes output transport stream to other studio components (e.g., editors, off-line storage elements and the like) via signal path S5, or to the network interface device 140 via signal path S6.

The network interface device (NID) 140 is used to communicate the output transport stream, control information or any other information between the television studio 100 of FIG. 1 and other studios (not shown). Optionally, the NID receives information streams from other studios, remote camera crews, broadcasters and the like. These streams are coupled to the play to air server 110 for immediate processing into an output transport stream being produced (e.g., "live" coverage of a news event), for delayed processing or for storage in the mass storage device (with or without processing).

The play to air server 110 and mass storage device 115 may be implemented using a compressed bitstream video server such as the Origin 2000 "Play-To-Air /Production Server" manufactured by SGI of Mountain View, Calif.

The play to air controller 120 comprises a play list 125 corresponding to the information streams or clips that are to be scheduled for subsequent incorporation into the output transport stream of the play to air server 110. The play list 125 includes exact frame entry and exit locations of each of the information streams or clips that are to be retrieved from the mass storage device 115 and concatenated or spliced into the output transport stream by the play to air server. The play list 125 may also identify the first and last frames for each of the information streams or clips.

The play to air server 110, in response to a control signal from the play to air controller providing at least portions of the play list 125, retrieves the appropriate streams or clips from the mass storage device and splices the clips in a seamless, frame accurate manner according to the frame entry and exit information within the control signal to produce the output transport stream. Importantly, the output transport stream produced has no syntax errors or discontinuities to any other studio component, including any remote feeds provided by the Network Interface Devices 140. The splicing or concatenation operations performed by the play to air server will be explained in more detail below with respect to FIG. 2A and FIG. 2B.

Figures 2A, 2B:
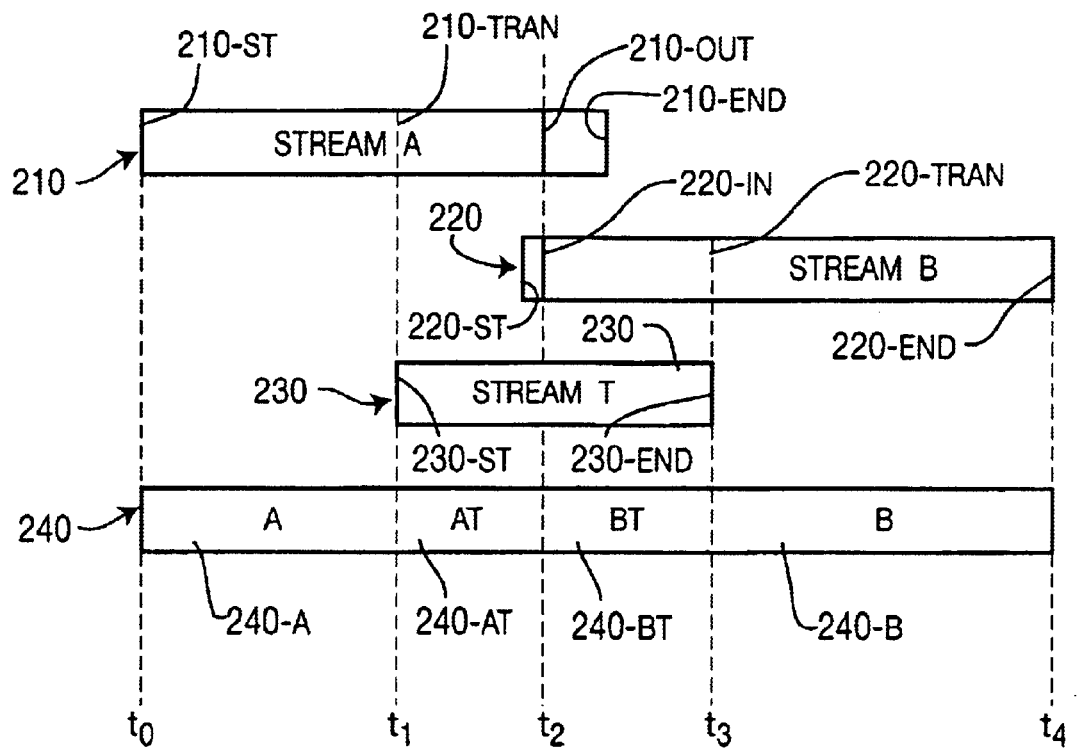
FIGS. 2A and 2B are graphical representations of a splicing operation useful in understanding the invention.

FIG. 2A and FIG. 2B are graphical representations of a splicing operation useful in understanding the invention. Specifically, FIG. 2A graphically depicts a frame accurate, seamless splicing operation of two 30 frames per second MPEG-2 transport stream clips (210, 220) using a transition clip (230) to produce a resulting spliced 30 frames per second MPEG-2 transport stream clip (240). The transition stream 230 is formed using portions of the first stream 210 and the second stream 220. The resulting spliced stream 240 comprises the concatenation of portions of the first 210, transition 230 and second 220 streams. The resulting spliced stream 240 comprises a "knife edge" or frame accurate splice between the first and second streams at an out-point (210-OUT) of the first stream 210 and an in-point (220-IN) of the second stream 220.

FIG. 2B depicts various SMPTE timecodes associated with the streams or clips depicted in FIG. 2A. The first stream or clip 210 (STREAM A) comprises a plurality of frames including a first frame 210-ST beginning at a time $t_0$, illustratively at a respective SMPTE timecode of 00:00:00:00; a transition out frame 210-TRANS beginning at time $t_1$, an out-frame 210-OUT ending at a time $t_2$, illustratively at a respective SMPTE timecode of 00:00:02:13; and a last frame 210-END starting at a time greater than time $t_2$.

The out-frame 210-OUT comprises the last frame of the first stream 210 to be displayed (i.e., the frame immediately preceding the desired splice point). The out-frame 210-OUT will be included within the transition stream 230. The transition out frame 210-TRANS comprises the last frame of the first stream 210 to be transmitted. That is, the transition stream 230 will be concatenated to the first stream 210 immediately after the transition out frame 210-TRANS.

The second stream or clip 220 (STREAM B) comprises a plurality of frames including a first frame 220-ST beginning at a respective SMPTE timecode of 00:00:00:00; an in-frame 220-IN beginning at time $t_2$, illustratively at a respective SMPTE timecode of 00:00:00:23; a transition in frame 220-TRANS beginning at time $t_3$ and a last frame 210-END ending at a time $t_4$, illustratively a respective SMPTE timecode of 00:00:04:17.

The in-frame 220-IN comprises the first frame of the second stream 220 to be displayed (i.e., the frame immediately following the desired splice point). The in-frame 220-IN will be included within the transition stream 230. The transition in frame 210-TRANS comprises the first frame of the second stream 220 to be transmitted. That is, the transition in frame 220-TRANS will be the first frame of the second stream 210 concatenated to the transition stream 230.

The transition stream or clip 230 (STREAM T) is a data structure well adapted to providing seamless, frame accurate splicing of video streams. The transition stream or clip 230 (STREAM T) comprises a plurality of frames including a first frame 230-ST beginning at a time $t_1$; and a last frame 230-END ending at time $t_3$. The transition clip is comprises frames from both the first stream 210 and the second stream 220, including the respective in-and out-frames. The beginning and end of the transition clip is depicted in FIG. 2 as, respectively, time $t_1$ and $t_3$. It must be noted that these times and the actual first and last frames of the transition stream will be determined according to methods that will be described below with respect to FIGS. 8 and 9.

The resulting spliced stream 240 comprises a plurality of frames including a first frame 240-ST beginning at time to, illustratively a respective SMPTE timecode of 00:00:00:00; and a last frame 240-END ending at time $t_4$, illustratively a respective SMPTE timecode of 00:00:04:17. The spliced stream 240 comprises 73 frames from the first clip 210 (i.e., $t_0$ through $t_2$) and 115 frames from the second clip 220 (i.e., $t_2$ through $t_4$).

The splice stream 240 depicted in FIG. 2A comprises the first 210 and second 220 streams concatenated in a manner (using the transition stream 230) to effect a knife edge splice (splice stream 240 timecode 00:00:02:13) where the first stream 210 is apparently exited at the out frame 210-OUT and the second stream 220 is apparently entered at in frame 220-IN. Utilizing the present invention, this splicing operation occurs in a frame accurate manner, regardless of the frame type of the out (exit) and in (entry) frames.

It should be noted that under ideal splicing conditions (discussed in the SMPTE 312M splicing standard) it is possible that no transition clip is required. However, under most conditions, the transition clip will contain multiple frames rather than the "empty frame" transition clip that may be generated under the ideal conditions.

Figure 3:
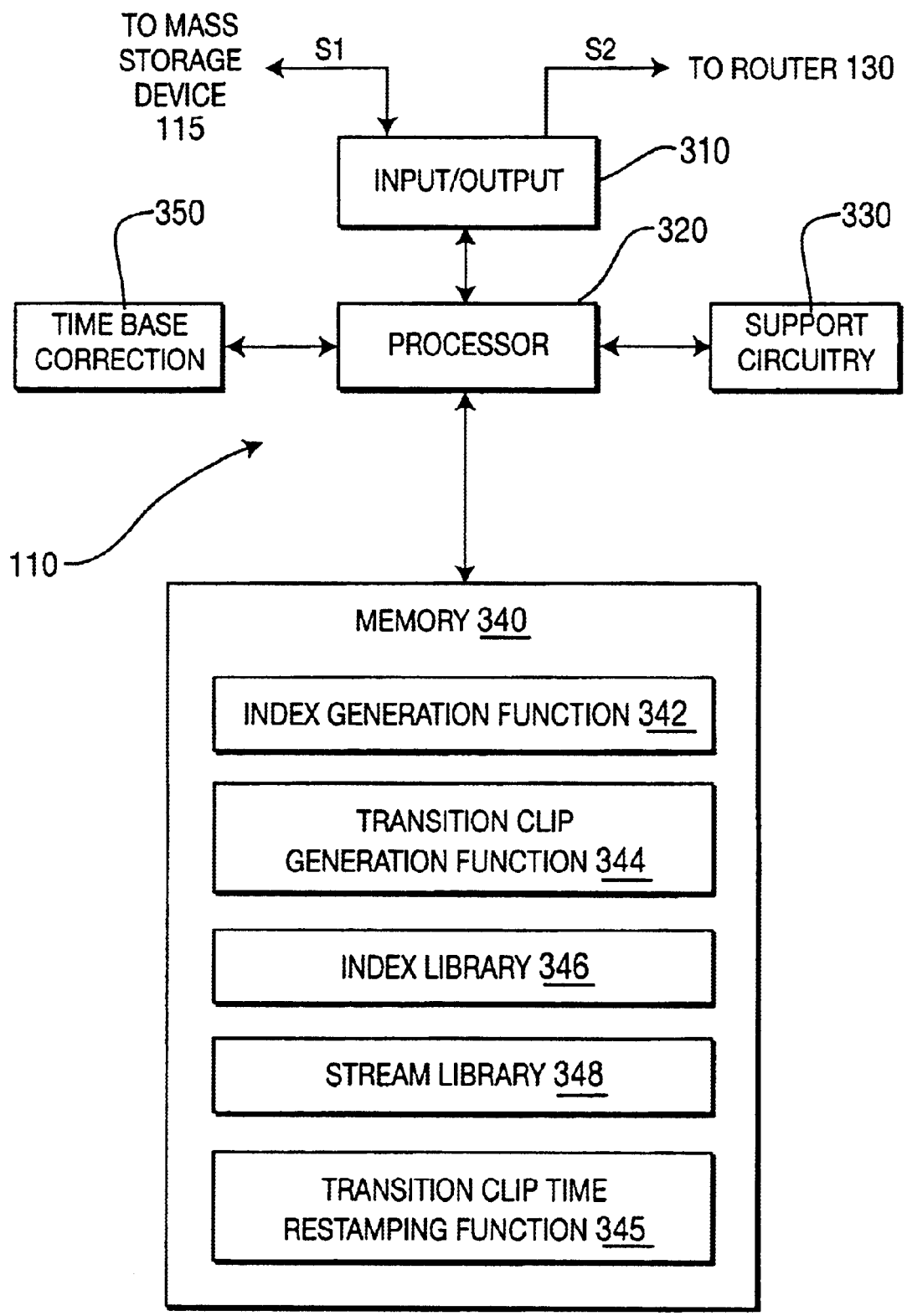
FIG. 3 depicts an embodiment of a play to air server suitable for use in the television studio of FIG. 1.

FIG. 3 depicts an embodiment of a play to air server suitable for use in the television studio of FIG. 1. Specifically, the exemplary play to air server 110 of FIG. 3 comprises an input/output (I/O) circuit 310, support circuitry 330, a processor 320, a memory 340 and an optional time base corrector 350. The processor 320 cooperates with conventional support circuitry 310 such as power supplies, clock circuits, cache memory and the like as well as circuits that assist in executing the various software routines within the play to air server 110. The play to air server 110 also includes input/output circuitry 310 that forms an interface between the play to air server 110 and the mass storage device 115 and router 130.

The memory 340 includes programs and other information suitable for implementing the invention. Specifically, the memory 340 is used to store programs that, when executed by the processor 320, perform an index generation function 342, a transition clip generation function 344 and, optionally, a transition clip time restamping function 345. Optionally, the memory 340 includes one or both of an index library 346 and a stream library 348.

To provide a splicing operation such as described above with respect to FIGS. 2A and 2B, the invention utilizes the transition clip generation function 344. The transition clip generation function 344 generates a transition clip, such that it is possible to exit the first stream 210 at a first prescribed Transport Packet boundary (determined by, e.g., the transition stream generator), run the generated transition clip 230, and then enter the second stream 220 at a second prescribed Transport Packet boundary. The actual exit (210-TRANS) and entry (220-TRANS) points to the first 210 and second 220 stream will typically not correspond to the actual frames that were requested. Rather, the transition clip will be constructed using some number of frames immediately before the splice required exit point 210-OUT of the first stream 210, and some number of frames immediately after the splice required entry point 220-IN of the second stream 220.

The invention selects frames to be included in the transition stream in a manner that, preferably, optimizes the quality of the inter-stream transitions. That is, even though a splicing operation is performed in a frame accurate and seamless manner, it is possible for the splicing operation to result in qualitative degradation of video information near the splicing points. This is caused by "bit starving" or other coding anomalies resulting from, e.g., mismatched video buffering verifier (VBV) levels. The invention adapts the VBV levels to minimize such anomalies.

The index generation function 342 will now be described in detail. Two types of information are used to build a transition clip, frame data and MPEG data. Frame data comprises information such as the location, coding type and presentation order of particular frames in the from-and to-streams. Frame data is used to determine which frames within the from-stream and the to-stream are to be recoded to produce the transition clip. MPEG data comprises information such as frame dimensions, bit rate, frame versus field formats, video buffering verifier (VBV) delay, chrominance sampling formats and the like. MPEG data is used to specify the MPEG encoding characteristics of the transport stream. The transition clip is preferably encoded or recoded using the same MPEG parameters as the input TS.

To assist in the generation of transition clip(s) by the transition clip generation function 344, the invention utilizes the index generation function 342. Specifically, the index generation function 342 is used to processes each of the transport streams to be spliced to determine several parameters associated with each frame within the transport streams. The determined parameters are stored in a meta file, such that each transport stream processed by the index generation function 342 has associated with it a meta file. The transport streams processed by the index generation function 342 may be stored in the mass storage device 115 or in the stream library 348. Similarly, the meta file associated with a transport stream may be stored in the mass storage device 115 or in the index library 346.

In the exemplary embodiment, the index generation function 342 determines, for each respective video frame in a transport encoded video stream, the following:
1) the current picture number (in display order);
2) picture coding type (I-, P- or B-frame);
3) the number of the transport packet containing the start of the frame;
4) the number of the transport packet containing the end of the frame;
5) the presentation time stamp (PTS) of the frame;
6) the decode time stamp (DTS) of the frame;
7) the number of the transport packet containing the start of the sequence header preceding the frame;
8) the number of the transport packet containing the start of the picture header preceding the frame; and
9) any indicia of the frame comprising an appropriate in frame or out frame, such as provided by frame markings according to the SMPTE 312M splicing syntax.

In addition to the per-frame data, the index generation function 342 optionally saves all fields for common MPEG-2 structures such as sequence headers, picture headers and the like.

Thus, the stream library 348 (or mass storage device 115) comprises transport streams that have been processed according to the index generation function 342. An embodiment of the index generation function 342 will be described below with respect to FIG. 10.

Since parsing a transport stream can be time consuming, one embodiment of the invention utilizes pre-indexing. That is, transport streams stored within the mass storage device 115 or stream library 348 are processed by the index generation function 342 at the time of storage or as soon as possible thereafter. In this manner the time required to build transition clips is greatly reduced since there is no need to parse transport streams at the time of splicing to determine frame and MPEG parameters of the streams. In addition, the play to air server 110 optionally utilizes the meta files stored within the mass storage device 115 or index library 346 to quickly retrieve characteristics of a transport stream that may be needed for scheduling and other functions, such as frame rate.

Figure 10:
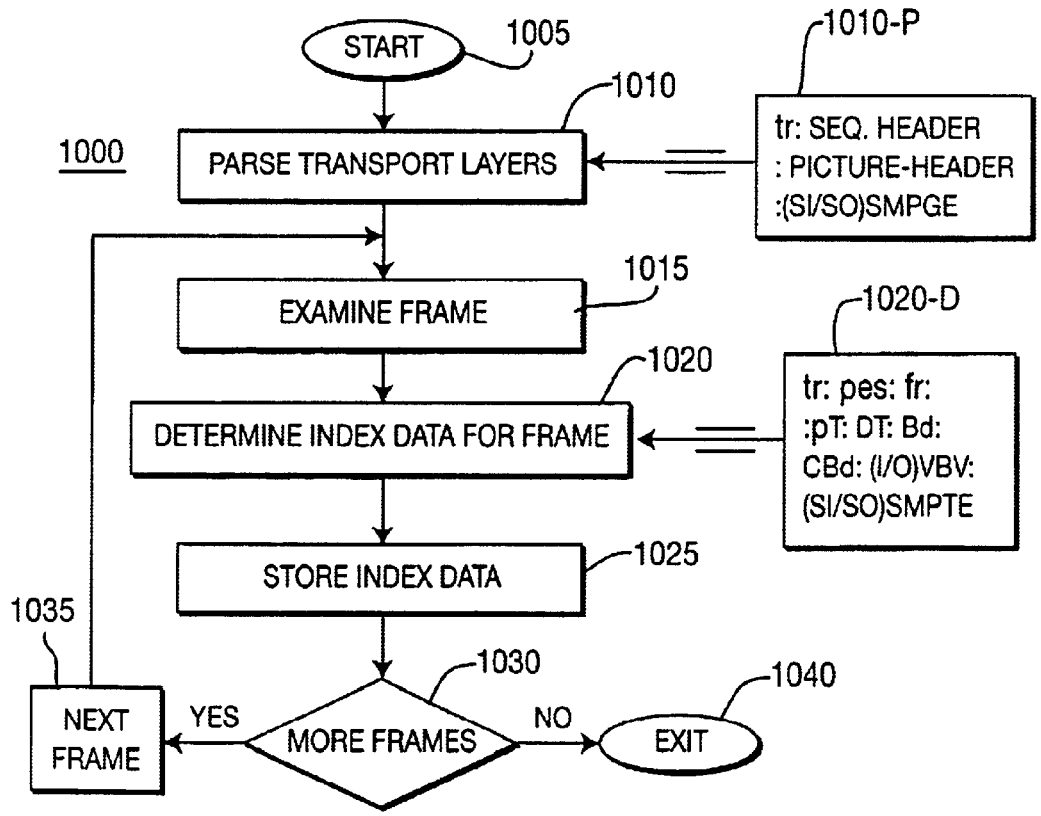
FIG. 10 depicts a flow diagram of a method for indexing an information stream.

FIG. 10 depicts a flow diagram of a method for indexing an information stream. Specifically, FIG. 10 depicts a flow diagram of a method 1000 suitable for use in the index generation function 342 of the play to air server 110 of FIG. 3. The method 1000 of FIG. 10 is suitable for use in implementing step 705 of the method 700 of FIG. 7.

The method 1000 is entered at step 1005, when an information stream to be indexed is received. The method 1000 then proceeds to step 1010.

At step 1010 the transport layer of the information stream to be indexed is parsed. That is, the header portion of each transport packet within the information stream to be parsed is examined to identify a transport packet number (tr), the presence or absence of a sequence header within the transport packet, the presence or absence of a picture header within the transport packet, the presence or absence of a SMPTE 312M splicing syntax indication of a splicing in-frame or a splicing out-frame and other information. The method 1000 then proceeds to step 1015.

At step 1015 the first or present frame is examined. That is, the information stream to be indexed is parsed down to the packetized elementary stream (PES) layer to examine the first video frame of the video elementary stream included within the information stream to be indexed. The method 1000 then proceeds to step 1020.

At step 1020 various parameters associated with the frame examined in step 1015 are determined. Specifically, referring FIG. 1020-D, step 1020 determines the current picture number (in display order), the picture coding type (I-, P- or B- frame), the number of the transport packet containing the start of the frame, the number of the transport packet containing the end of the frame and the presentation times stamp (PTS) and decode time stamp (DTS) of the frame. As previously noted with respect to step 1010, the transport packet containing the start of the sequence header preceding the frame has been noted, the number of the transport packet containing the start of the picture header preceding the frame has been noted and any indicia of the frame comprising an appropriate in-frame or out-frame, such as provided by frame markings according to the SMPTE 312M splicing syntax have been noted. Additionally, at step 1020 the "CBd and Bd" are also determined. The method 1000 then proceeds to step 1025.

The quantity Bd is a buffer delay as marked in the stream. This is the amount of time the first bit of a picture remains in the VBV buffer. The quantity CBd is the calculated buffer delay. The indexer calculates this value as indicated in Annex C of the MPEG-2 specification. The buffer delay Bd and calculated buffer CBd should match, but if the input stream is improperly marked the two quantities may differ. The buffer delay value is used by the invention to determine how to adjust the VBV levels between 210trans and 220trans. The VBV level adjustment is done in the transition clip.

At step 1025 the information regarding the index information is stored in, e.g., the mass storage device 115 or the index library 346. The method 1000 then proceeds to step 1030.

At step 1030 a query is made as to whether more frames are to be processed. If the query is answered negatively, then the method 1000 proceeds to step 1040 where it is exited. If the query is answered affirmatively, then the method 1000 proceeds to step 1035 where the next frame is queued, and to step 1015, where the next queued frame is examined.

FIG. 11 depicts a tabular representation of a meta file suitable for use in the index library 346 of FIG. 3. Specifically, the table 1100 of FIG. 11 comprises a plurality of records (1–54), each record being associated with a respective starting transport packet field 1110, packetized elementary stream identification field 1120, frame and frame type identification field 1130, PTS field 1140, DTS field 1150, $B_d$ field 1160, $CB_d$ 1170 and marked splice point field 1180.

In one embodiment of the invention, the index generation function 342 is not used prior to receiving and/or splicing transport streams. In this embodiment, frame selection is accomplished using a single-pass processing of at least a portion of each transport stream to be spliced to determine several parameters related to the from-stream and to-stream.

For both the from-stream and the to-stream, the following parameters are determined: transport packet offsets of the sequence_header and picture_header to begin decoding, the number of frames to decode; and the number of decoded frames to discard (e.g., anchor frame needed to decode frames to be included in the transition clip).

For the from-stream only, the following parameters are determined: the last transport packet to play from the from-stream (i.e., the new exit point or exit frame); and the PTS of first frame to display in the transition clip.

For the to-stream only, the following parameters are determined: the starting and ending transport packets for the I-frame to copy to the transition clip; the starting and ending transport packets for remaining GOP to copy to the transition clip; the first transport packet to play from the to-stream (i.e., the new entry point or entry frame); and the number of frames to be copied.

In addition, since the indexing library retrieves MPEG fields as it parses a transport stream, all required recoding parameters are also saved during frame selection.

The transition clip generation function 344 will now be described in detail. The process of constructing a transition clip comprises the steps of 1) determining which frames to include in the transition clip; 2) decoding the frame to be included in the transition clip; 3) encoding or recoding the frames forming the transition clip and 4) transport encoding (i.e., packetizing) the transition clip.

Frame selection affects the size of the output transition clip, the amount of time required to generate the transition and places constraints on the encoder in terms of optimizing the quality of the recoded video. The frame selection method discussed herein resolves the issues of frame dependencies while reducing the frame count and still allowing enough transition time to recode the video without significant loss of quality.

The encoding or recoding step is typically the most time consuming step in the transition clip generation function 344, so reducing the number of frames to recode provides time savings. However, since one of the primary reasons for building a transition clip is to reconcile differences in VBV levels between the two transport streams being spliced. Reducing the frame count makes it more difficult for the encoder to maintain video quality while adjusting the VBV level (especially when decreasing it, since frames must be encoded with fewer bits). To decrease the VBV level, fewer bits must be placed into the buffer than are taken out. This requires the encoder to use fewer bits per picture (on average).

FIG. 5 depicts a tabular representation of image frame display order and image frame transmission order useful in understanding the invention. Specifically, FIG. 5 depicts a first tabular representation 510 depicting the display order of, illustratively, 24 encoded image frames forming a portion of a video sequence and a second tabular representation 520 depicting the transmission order of the 24 image frames forming the video sequence. For purposes of this discussion, the video sequence depicted in FIG. 5 comprises a portion of a from-stream video sequence (i.e., the first displayed sequence in a spliced sequence), such as described above with respect to the first stream 210 of FIG. 2.

Specifically, per the first tabular representation 510, the image frames are displayed and encoded according to a group of pictures (GOP) structure as follows (from frame 1 to frame 24):

I-B-B-P-B-B-P-B-B-I-B-B-P-B-B-P-B-B-I-B-B-P-B-B.

Additionally, per the second tabular representation 520, the image frames are transmitted in the following frame order:

1-4-2-3-7-5-6-10-8-9-13-11-12-16-14-15-19-17-18-22-20-21-25-23.

It is assumed, for purposes of the following discussion, that it is desired to exit the video sequence depicted in FIG. 5 at frame 15, which comprises a B-frame. That is, frame 15 comprises the out-frame of the exit stream depicted in FIG. 5. As will be discussed below, frames 10 through 15 will be decoded (in display order). It should be noted that frame 16 is the previous anchor frame to frame 15 in transmission order. Therefore, it is necessary to decode frame 16 prior to decoding frames 14 and 15 (which are B-frames). The last frame in the from-clip prior to the transition clip will be frame 13. That is, the from-clip will be exited immediately before frame 16.

FIG. 6 depicts a tabular representation of image frame display order and image frame transmission order useful in understanding the invention. Specifically, FIG. 6 depicts a first tabular representation 610 depicting the display order of, illustratively, 26 encoded image frames forming a portion of a video sequence and a second tabular representation 620 depicting the transmission order of the 26 image frames forming the video sequence. For purposes of this discussion, the video sequence depicted in FIG. 6 comprises a portion of a to-stream video sequence (i.e., the second displayed sequence in a spliced sequence), such as described above with respect to the second stream 220 of FIG. 2.

Specifically, per the first tabular representation 610, the image frames are displayed and encoded according to a group of pictures (GOP) structure as follows (from frame 1 to frame 26):

I-B-B-P-B-B-P-B-B-I-B-B-P-B-B-P-B-B-I-B-B-P-B-B-I-B.

Additionally, per the second tabular representation 520, the image frames are transmitted in the following frame order:

1-4-2-3-7-5-6-10-8-9-13-11-12-16-14-15-19-17-18-22-20-21-25-23-24-28.

It is assumed, for purposes of the following discussion, that it is desired to enter the video sequence depicted in FIG. 6 at frame 15, which comprises a B-frame. That is, frame 15 comprises the in-frame of the entry stream depicted in FIG. 6. As will be discussed below, frames 10 through 18 will be decoded (in display order). It should be noted that the first frame to be displayed from the to-stream is frame 25 (an I-frame that is not included in the transition clip).

Figure 7:
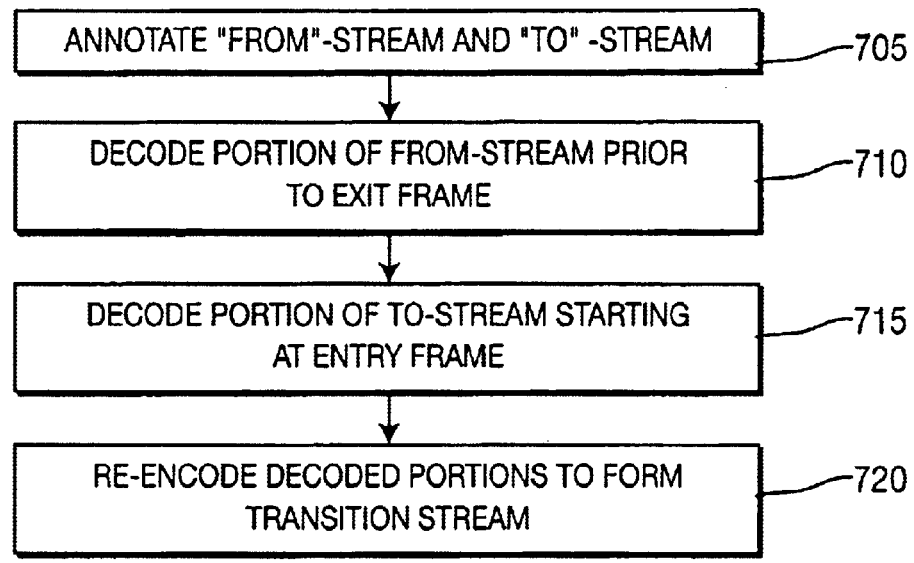
FIG. 7 depicts a flow diagram of a method for generating a transition stream or transition clip.

FIG. 7 depicts a flow diagram of a method for generating a transition stream or transition clip. Specifically, FIG. 7 depicts a flow diagram of a method 700 suitable for use in the transition clip generation function 344 of the play to air server 110 of FIG. 3.

The method 700 is entered at step 705, where a "from-stream" and "to-stream" are annotated. That is, the information stream providing the information prior to a splice point (the from-stream) and the information stream providing information subsequent to the splice point (the to-stream) are annotated to identify, on a frame-by-frame basis various frame parameters as described above with respect to the index generation function 342. A method for annotating an information stream is described above with respect to FIG. 10. The method 700 then proceeds to step 710.

At step 710 a portion of the from-stream prior to the exit frame is decoded. That is, a plurality of information frames within the from-stream, including the exit frame (i.e., the last information frame within the from-stream to be displayed) are decoded. The method 700 then proceeds to step 715.

At step 715 a portion of the to-stream starting at the entry frame is decoded. That is, information frames within the to-stream beginning with the entry frame (i.e., the first frame of the to-stream to be displayed) are decoded. The method 700 then proceeds to 750.

At step 720 the decoded portions of the from-stream and to-stream are re-encoded to produce a transition clip or transition stream. A transport stream including, e.g., video and audio information associated with the from-stream and to-stream.

The transition stream or transition clip generated by the method 700 of FIG. 7 is used as a transition between the from-stream and the to-stream by, e.g., the play to air server 110 of FIGS. 1 and 3.

A. Frame Selection.

The first step in the process of constructing a transition clip or transition stream comprises the step of determining which frames to include in the transition clip (i.e., the frame selection process).

Figure 8:
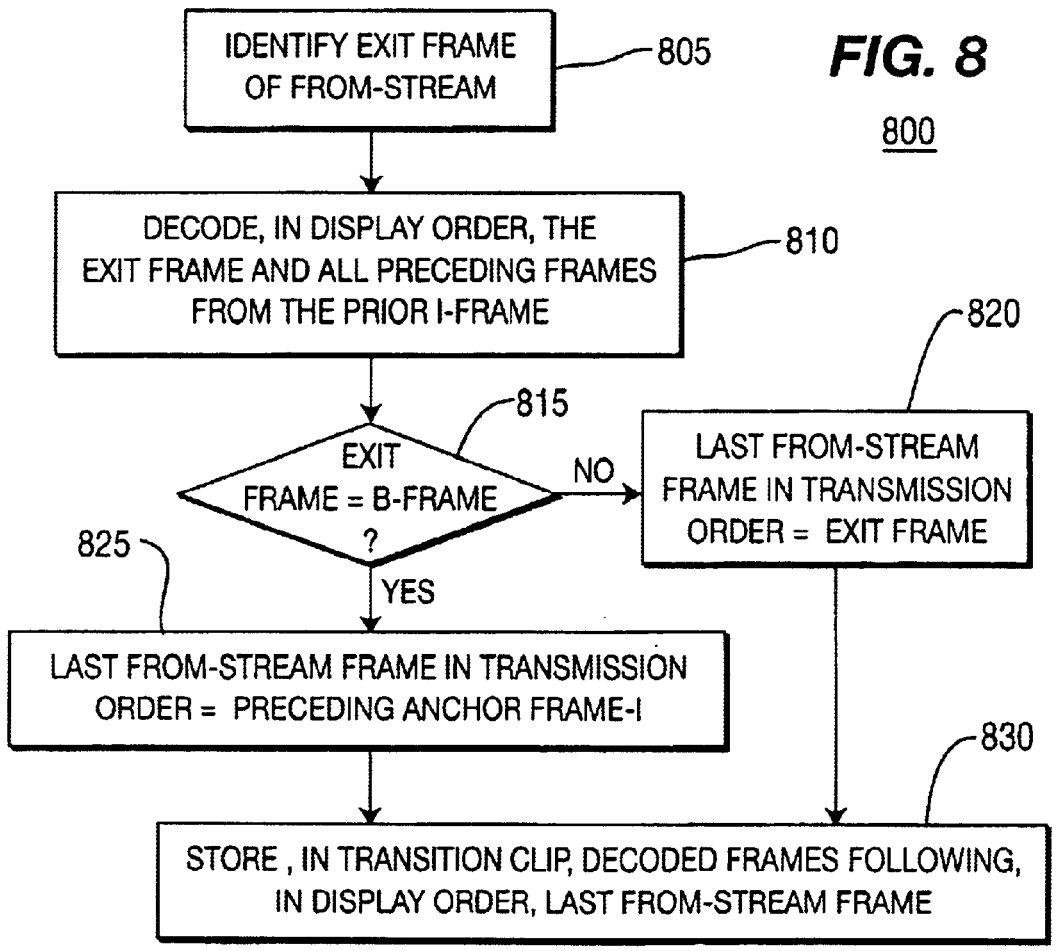
FIG. 8 depicts a flow diagram of a method of determining which information frames within a from-stream should be included within the transition stream.

FIG. 8 depicts a flow diagram of a method of determining which information frames within a from-stream should be included within the transition stream. The method 800 of FIG. 8 is suitable for use in implementing step 710 of the method 700 of FIG. 7.

The method 800 is entered at step 805, where the exit frame of the from-stream is identified. The exit frame of the from-stream is the last frame within the from-stream to be displayed prior to a splice point. For example, referring now to the from-stream depicted in FIG. 5, the exit frame (frame 15) comprises a B-frame denoted as frame 513. The method 800 then proceeds to step 810.

At step 810 the method 800 decodes, in display order, the exit frame and the immediately preceding non-anchor frames. That is, referring again to FIG. 5, the exit frame (frame 15) and the immediately preceding non-anchor frames (frames 11, 12, 13 and 14) are decoded. Since frames 11, 12 and 13 are predicted using frame 10, it is necessary to also decode frame 10. However, the decoded frame 10 may be discarded after frames 11–13 have been decoded. That is, all frames from the I-frame preceding the exit frame in display order up to and including the exit frame are decoded. It is necessary to start from the I-frame because the I-frame has no frame dependencies (i.e., it can be decoded without first decoding any other frames). The method 800 then proceeds to step 815.

At step 815 a query is made as to whether the exit frame is a B-frame. If the query at step 815 is answered negatively, then the method proceeds to step 820. If the query at step 815 is answered affirmatively, then the method 800 proceeds to step 825.

At step 820, since the exit frame is either an I-frame a P-frame, the last from-stream frame to be displayed (i.e., the transition frame) prior to the transition stream frames is the frame immediately preceding, in transmission order, the exit frame. That is, if frame 15 of the from-stream depicted in FIG. 5 was a P-frame or I-frame rather than B-frame, then the last from-stream frame to be displayed would be frame 14. If the exit frame is an I- or P-frame, frame dependencies and reordering make it possible to leave the transport immediately before the next anchor frame (i.e., after all B-frames that are dependent on the exit frame). While this reduces the number of frames to recode, it also reduces the opportunity to adjust VBV levels for the transition. The method 800 then proceeds to step 830.

At step 825 if the exit frame is a B-frame (such as the exit frame in the from-stream depicted in FIG. 5), then the last from-stream frame to be displayed is the frame immediately preceding, in transmission order, the preceding anchor frame. Referring now to FIG. 5, the preceding anchor frame with respect to the exit frame is a P-frame (frame 13). It should be noted that the last frame to be transmitted of the 24 frame sequence depicted in FIG. 5 is the B-frame 12, while the last frame to be displayed is the P-frame 13. The method 800 then proceeds to step 830.

At step 830 the decoded frames following, in display order, the last from-stream frame (e.g., the B-frame denoted as frame 12 in FIG. 5) are stored in the transition clip. It should be noted that the transition stream or clip will also include frames from the to-stream. All of the frames that are stored within the transition clip will then be re-encoded to form an encoded transition clip or transition stream.

Figure 9:
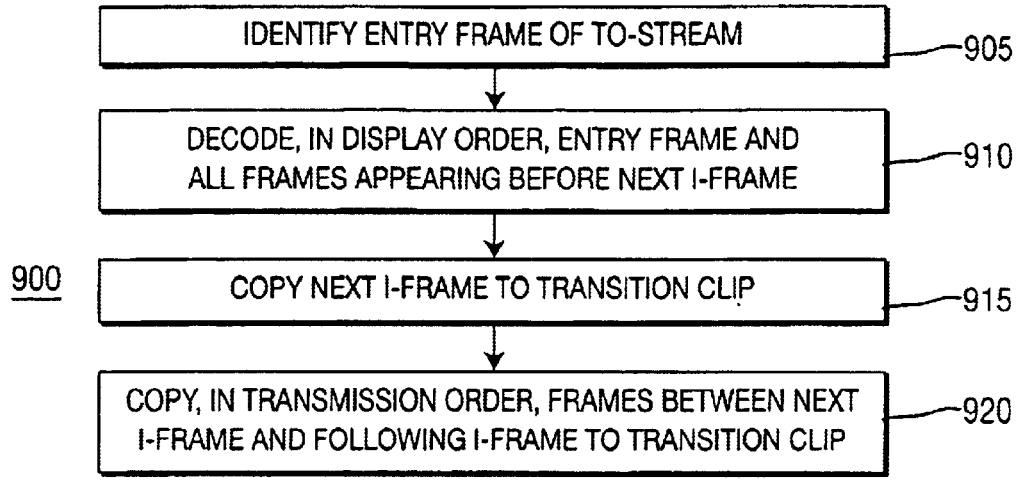
FIG. 9 depicts a flow diagram of a method for determining which information frames within a to-stream should be included within the transition stream.

FIG. 9 depicts a flow diagram of a method for determining which information frames within a to-stream should be included within the transition stream. Specifically, the method 900 of FIG. 9 is suitable for use in implementing step 715 of the transition stream generation method 700 of FIG. 7.

The method 900 is entered at step 905, where the entry frame of the to-stream is identified. The entry frame of the to-stream is the first frame within the to-stream to be displayed after a splice point. For example, referring now to the to-stream depicted in FIG. 6, the entry frame (frame 15) comprises a B-frame. The method 900 then proceeds to step 910.

At step 910 the entry frame and all frames appearing before the next I-frame, in display order, are decoded. That is, referring to FIG. 6, the entry frame (frame 15) and all frames (i.e., frames 16, 17 and 18) appearing before the next I-frame (frame 19) are decoded. Since frames 17 and 18 in the to-stream video sequence depicted in FIG. 6 are predicted using information from the next I-frame (frame 19), it is necessary to also decode the next I-frame. However, the decoded frame 19 may be discarded after frames 17 and 18 have been decoded. The method 900 then proceeds to step 915.

At step 915 the next I-frame (e.g., frame 19 of video sequence 610) is copied to the transition clip. That is, the video information within the transport packets forming the to-stream (i.e., the video elementary stream information) are extracted from the transport packets and copied to the transition clip. It is noted that the output of the encoder is a video elementary stream (VES) such that the output from the encoder may be copied directly to the transition clip. The transition clip will be subsequently packetized. The method 900 then proceeds to step 920.

At step 920 the frames (e.g., frames 20 through 22) between the next I-frame (e.g., frame 25) and the following I-frame (frame 19) are also copied, in transmission order, to the transition clip. It must be noted that the frames copied to the transition clip in steps 915 and 920 (e.g., frames 19–21) are copied to the transition clip as encoded frames. Thus, the method 900 adds to the transition clip decoder frames comprising the entry frame and all frames appearing before the next I-frame, and encoded frames comprising the next I-frame and all frames between the next I-frame and the following I-frame.

The from-stream and to-stream frame selection methods described above with respect to FIGS. 8 and 9 allow for frame dependencies between the transition stream frames and those in one or both of the from-stream and to-stream. The following constraints should be observed. The transition clip is encoded as a closed GOP structure. That is, the transition clip is a self-contained video clip. The transport stream being exited will not reference any frames in the transition clip. If the transport stream being entered is coded using an open GOP structure, then it may contain frames that reference frames in the transition clip.

An important aspect of the invention is the processing of the transition clip to appropriately address frame dependencies of frames that are included within the transition clip. A frame dependency comprises, e.g., a predicted frame within the transition clip (i.e., a P-frame or B-frame) that must be decoded using an anchor frame from outside of the transition clip. While it is desirable to create a transition clip in which there are no external frame dependencies (i.e., a "self contained" clip), the invention is capable of producing an MPEG compliant transition clip including such frame dependencies.

B. Decoding.

The second step in the process of constructing a transition clip or transition stream comprises the step of decoding the frames selected in the frame selection process. The decoding of the selected frames may be effected using standard hardware or software decoding techniques.

It should be noted that, regardless of which frames are to be decoded, decoding must begin at an I-frame. As an artifact of the use of prediction in MPEG encoding, every non-I-frame is ultimately dependent on the previous I-frame. The above-described frame selection methods break these dependencies in order to enable frame accurate, seamless splicing between transport streams.

C. Encoding.

The third step in the process of constructing a transition clip or transition stream comprises the step of encoding the decoded frames resulting from the frame selection and decoding processes. The encoding of the selected frames may be effected using standard hardware or software decoding techniques.

In addition to breaking frame dependencies (as noted above), one of the primary objectives when generating a transition clip is to adjust the VBV levels between the from-stream and to-stream such that a far-end decoder processing the resulting spliced transport stream will not suffer overflow, underflow or other undesirable decoder buffer memory behavior. For example, if the VBV level at the exit point of the from-stream is lower than the VBV level at the entry point of the to-stream, then underflow may result downstream from the splice. In typical decoders this will result in "freeze frames" while the decoder waits for data to become available. A much more serious problem occurs when the VBV level at the exit point of the from-stream is higher than the VBV level of the entry point of the to-stream. This may result in a VBV overflow downstream from the splice. An overflow occurs when more data is available than can be buffered. Overflows result in lost and/or corrupted data and typically cause visual artifacts in the decoded pictures and can even cause a decoder to reset.

After the selected frames have been decoded to baseband, they are recoded into a VES. The inventors used a Sarnoff Corporation DTV/MPEG-2 Software Encoder to ensure high overall performance, picture quality and modularity. The rate control algorithm in the encoder was modified to allow specification of initial and ending VBV levels, while the input module of the encoder was updated to support the output file format of the decoder. The MPEG encoding parameters that were parsed from the transport stream during frame selection are passed to the encoder to ensure that the recoded video is compatible with the clips being spliced.

With respect to rate control (which ultimately determines overall picture quality of the recoded portion of the transition clip), when adjusting the VBV level upwards, the selected frames are coded using fewer bits than the original streams. While increasing the VBV level may result in some loss of quality in the resulting output, due to masking in the human visual system, a small degradation in video quality at a scene change is often imperceptible to a viewer. The inventors have determined that such visual degradation imparted to a stream including a frame accurate, seamless splice does not result in a perceptible level of video degradation.

In one embodiment of the invention, the from-stream and to-stream each comprise transport streams having respective video buffering verifier (VBV). The invention determines if a difference exists between the from-stream VBV and the to-stream VBV and responsively adapts the re-encoding process to such a difference, as necessary. For example, the invention may adapt the re-encoding process by increasing a rate control bit allocation in response to a determination that the from-stream VBV exceeds the to-stream VBV by a first threshold level, and by decreasing the rate control bit allocation in response to a determination that the to-stream VBV exceeds the from-stream VBV by a second threshold level.

D. Packetizing.

The fourth step in the process of constructing a transition clip or transition stream comprises the step of encoding the decoded frames resulting from the frame selection and decoding processes After recoding the selected frames, the I-frame and remaining GOP that were copied from the to-stream are appended to the recoded VES. Pending restamping of temporal_reference fields, the resulting transition clip comprises a syntactically complete MPEG-2 stream (except that is does not have a sequence_end_code) and contains all frames in the transition. The final step is to packetize the VES into a transport stream.

The first step in packetizing the transition stream is to parse the transition stream to locate the offsets of the start of each frame (either a sequence_header or a picture_header) and the types of frames within the transition stream. Once this data is available, the dependencies between frames are calculated and the frame display order is determined. It should be noted that the temporal_reference fields are unsuitable for this purpose since they are presently invalid due to GOP restructuring. Once the display order has been determined, the temporal_reference fields are re-stamped and the presentation (PTS) and decode (DTS) time stamps are calculated for each frame in the transition stream.

It should be noted that according to the MPEG-2 standard, temporal discontinuities within a transport stream are allowed. However, since some decoders are not entirely compliant with the MPEG-2 standard, such allowed temporal discontinuities within a transport stream result in improper decoder operation. Thus, it is desirable to remove such temporal discontinuities within a transport stream by the use of the re-stamping process.

Using the output of the restamping process, PES headers are generated and the frames are output into a PES stream. The location of each PES header and the size of each PES packet are recorded during this process. Finally, transport packets are generated to hold the PES packets. Each layer of packets adds overhead to the TS resulting in a slight size increase. The packets in the resulting TS are stamped with the PID of the video stream being spliced. The final output of the packetizing process is a TS containing a single VES. The stream does not contain any program specific information (PSI).

E. Remultiplexing.

The final step in the process of constructing a transition clip or transition stream comprises the step of remultiplexing the video clip (now a transport stream) with program specific information (PSI) from the original program stream.

To accomplish the remultiplexing step, the from-stream is examined to extract (as transport packets) a single instance of the program association table (PAT) and the program map table (PMT). In the case of splicing single program transport streams there will only be one PMT. In the case of splicing multiple program transport streams there will only be multiple PMTs. Optionally, to fully implement the ATSC broadcast format, it is necessary to extract other tables as well (as known to those skilled in the art).

After extracting the PAT and the PMT(s), the number of packets in the transition clip is calculated based on the multiplex bit rate, the number of frames in the transition clip and the frame rate. For example, the ATSC specification requires a PAT at least every 100 ms and a PMT at least every 400 ms. The number of packets between PAT and PMT tables is determined from the multiplex bit rate.

After calculating the number of packets in the transition clip, a blank transition clip composed of null transport packets is created and the PAT and PMT tables are inserted at the calculated spacings (e.g., PAT every 100 mS and PMT every 400 mS).

After appropriately inserting the PAT and PMT(s) in the blank transition stream, the video transport stream is inserted into the blank transition stream by spacing packets within the remaining available packets, thereby forming an output transport stream.

It should be noted that when inserting the PAT, PMT and video packets into the empty transition clip, each packet should be restamped with a new continuity-counter. The starting value of the continuity_counter is determined separately for each PID from the exit-stream or from-stream. If the video clip is too large, then there won't be enough transport packets in the transition clip, since the size of the transition clip is calculated with respect to the expected clip duration. This calculation takes into account the frame count, frame rate, VBV delays, multiplex bit rate etc. It is important that VBV adjustment is performed properly by the encoder.

The completed transition clip is then inserted between the spliced transport streams at the calculated transport packet offsets, thereby executing a seamless splice.

The above-described invention advantageously provides for seamless, frame accurate splicing or concatenation of transport streams using transition streams of clips, thereby avoiding the construction of an entirely new transport stream. The from-and to-streams are not modified during the process, since they are only used to provide information sufficient to produce the transition stream. The transition stream, after being used to effect a change between streams, may be discarded by the system or saved for future use.

The invention has primarily been described within the context of generating a transition stream comprising video information suitable for use in providing a seamless splice of, illustratively, an MPEG-2 transport stream including a video stream or sub-stream. It will be appreciated by those skilled in the art that other forms of information are often associated with such video streams. For example, many video streams are associated with corresponding audio streams. In addition, other forms of information such as data essence and meta-data may be incorporated into an information stream including video information. Data essence is data that has a context independent of the video and/or audio data within a stream. Examples of data essence comprise stock quotations, weather advisories and other news, messages or control information not related to the video and/or audio data and the like.

Meta-data is data relating to other data such as data describing characteristics of a video or audio stream. Examples of meta-data include video or internet data broadcast packets associated with a video or audio frame, such as alternate camera angles, names of actors in a movie, title of a presentation and the like.

In the case of audio information, data essence and/or meta-data associated with particular video frames within a video information stream, it is desirable to ensure that all data associated with the particular video frame is available to a receiver of that video frame. Thus, in the case of a splicing application where one or more video streams are concatenated to produce a spliced video stream, it is desirable to ensure that the audio information, data essence and/or meta-data associated with video frames utilized in the transition clip enabling the splice be included within that transition clip.

Figure 4A:
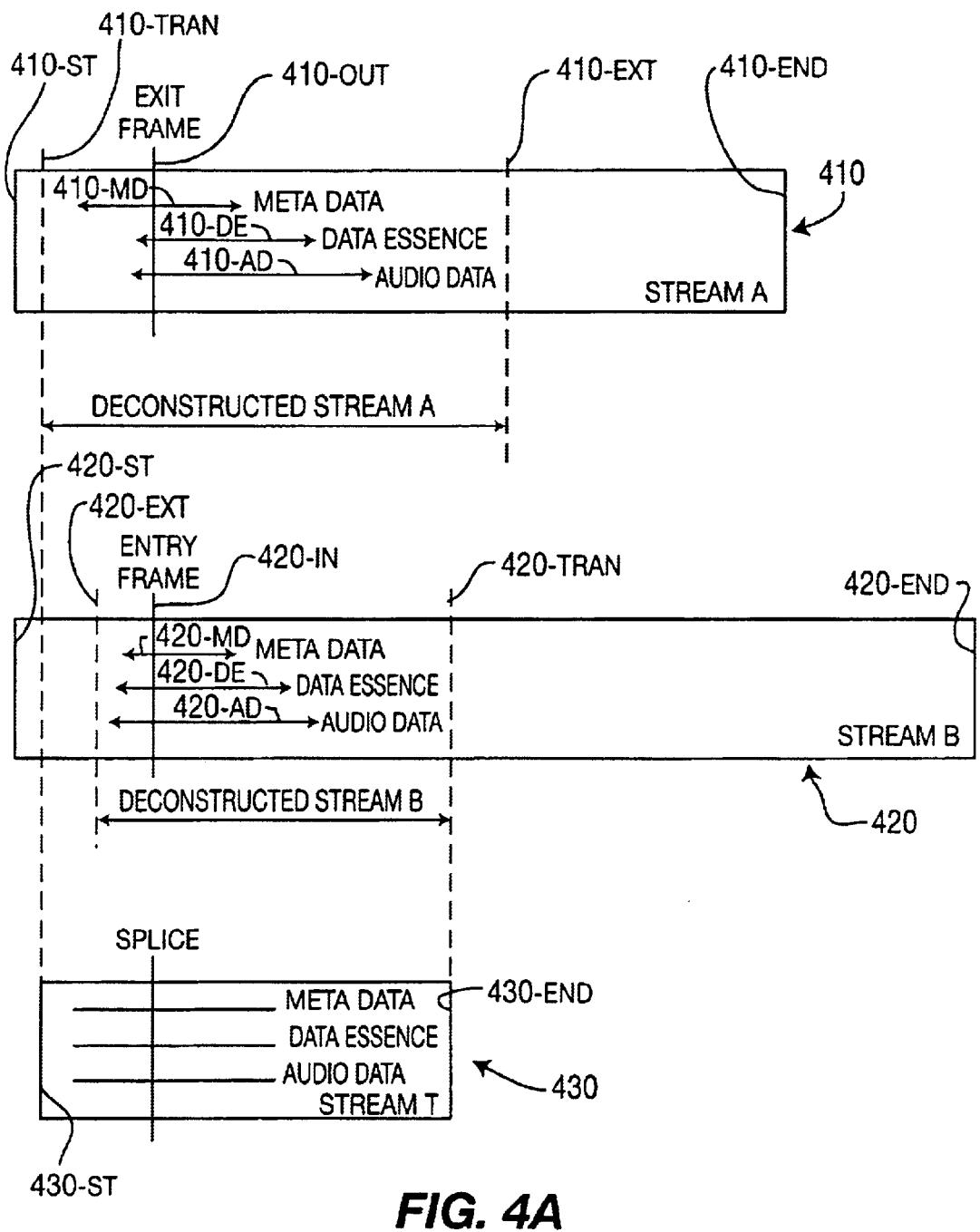
FIGS. 4A, 4B and 4C are graphical representations of a splicing operation useful in understanding the invention.

FIG. 4A comprises a graphical representation of a splicing operation useful in understanding the invention. Specifically, FIG. 4A comprises a from-stream 410, denoted as stream A; a to-stream 420 denoted as stream B; and a transition stream or transition clip 430 denoted as stream T. It should be noted that each of streams A (410), B (420), and T (430) are, illustratively, MPEG-s transport streams comprising video frames (not shown), meta-data, data essence and audio data. These transport streams are formed by multiplexing a plurality of packetized information streams to provide a resulting information stream including video, audio and other data streams. Unfortunately, the multiplexing process does not approximately align audio, data essence and meta-data packets to respective video times. That is, for each video frame within the transport stream, the packets containing that video frame may precede or follow (in bit stream order) packets including audio data, data essence or meta-data associated with that video frame. Thus, if a transition stream is formed with respect to only the video packets forming an exit or entry frame, the meta-data, data essence and/or audio data associated with the exit or entry frame are likely to be lost or incompletely provided to a transition stream.

Stream A (410) is bounded by a start video frame 410-ST and an ending video frame 410-END. Stream A comprises a from-stream that will be exited at an exit video frame 410-OUT. Thus, as discussed above with respect to the transition stream generation methods, the plurality of information frames beginning with a transitional video frame 410-TRAN and ending with an exit video frame 410-OUT will be decoded for use in forming the transition stream. However, the exit video frame 410-OUT is associated with meta-data 410-MD, data essence 410-DE and audio data 410-AD that is located within stream A after the exit video frame 410-OUT. It should be noted that such data may also be located before the exit video frame 410-OUT. Thus, to incorporate this non-video data into the transition stream it is necessary to extract or decode the non-video data. Referring to stream A (410), the non-video data associated with the exit frame 410-OUT is bounded by the transition frame 410-TRAN and an extent frame 410-EXT defining the maximal boundary (or extent) likely to be associated with the non-video data.

Stream B (420) is bounded by a start video frame 420-ST and an ending video frame 420-END. Stream B comprises a to-stream that will be entered at entry video frame 420-IN. Thus, as discussed above with respect to the transition stream generation methods, the plurality of information frames beginning with the entry frame 420-IN and ending with a transitional video frame 420-TRAN will be decoded for use in forming the transition stream 430. However, the entry video frame 420-IN is associated with meta data 420-ND, data essence 420-DE and audio data 420-AD that is located within stream B before the entry video frame 420-IN. It should be noted that such data may also be located after the entry video frame 420-IN. Thus, to incorporate this non-video data into the transition stream 430 it is necessary to extract or decode the non-video data. Referring to stream B (420), the non-video data associated with the entry frame 420-IN is bounded by an extent frame 420-EXT and the transition frame 420-TRAN. The extent frame 420-EXT defines the maximal boundary (or extent) likely to be associated with the non-video data preceding in bit stream order the entry frame 420-IN.

Thus, to capture all of the video frames appropriate to the transition stream and all of the non-video data associated with those video frames the deconstructed portion of stream A is bounded by 410-TRAN and 410-EXT. Similarly, the deconstructed portion of stream B is bounded by 420-EXT and 420-EXT and 420-TRAN. After decoding and/or extracting the video data, meta data, data essence and audio data from streams A and B, the transition stream 430 is formed in a manner including such data. Thus, transition stream 430 is bounded by a start frame 430-ST and an end frame 430-END. A SPLICE point then defining a frame accurate splice between the two streams at the appropriate exit frame 410-OUT and entry frame 420-IN. Additionally, the meta data, data essence and/or audio data associated with the video frames included within the transition stream 430 are also included within the transition stream. This non-video data may be arranged-within the transition stream irrespective of the splice point. That is, non-video data may be multiplexed with video data packets in a manner preserving the association between the non-video and video data packets.

Figure 4B:
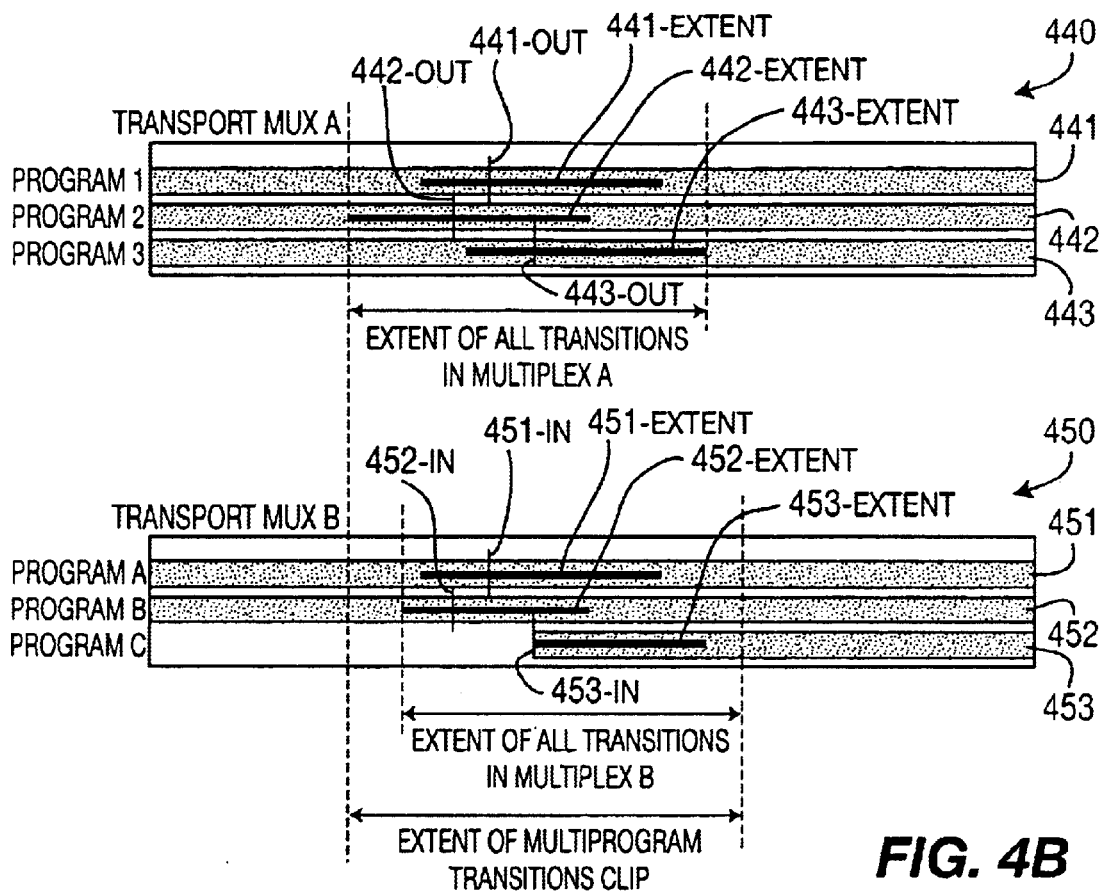

FIG. 4B comprises a graphical representation of a splicing operation useful in understanding the invention. Specifically, FIG. 4B comprises a first multi-program transport stream 440 and a second multi program transport stream 450. Each of the first 440 and second 450 multi program transport streams comprises a respective plurality of transport sub streams. The invention may be utilized to perform frame accurate, seamless splicing between such multi program transport streams in a manner preserving the associations between non-video data and the video data associated with it.

Transport multiplex A 440 comprises three transport sub streams, denoted as program 1 (441), program 1 (442) and program (443). Transport MUX B 450 comprises three transport sub streams denoted as program A (451), program B (452) and program C (453). For purposes of this discussion it is assumed that transport MUX B will be concatenated to transport MUX A at the sub stream level. That is, program 1 441 and program A 451 will be concatenated to form a first transport sub stream within a transition stream comprising a plurality of sub streams. Specifically, program 1 will be exited at an out frame 441-OUT while program A will be entered at an IN frame 451-IN. Similarly, program 2 will be exited at an out frame 442OUT while program B will be entered at an IN frame 452-IN; program 3 will be exited at an OUT frame 443-OUT while program C will be entered at an IN frame 453-IN. The resulting transition stream will comprise a transport multiplex stream comprising portions of all six streams including frame accurate seamless splice points as indicated in FIG. 4B and described above.

In addition to video frames, each of the transport sub streams includes non-video data such as meta data, data essence and audio data. As indicated in FIG. 4B, each of the splice points and the video frames included within the transition stream is associated with an extent of such non-video data. Thus, each of the transport MUX sub streams will be decoded or otherwise processed to accommodate the extraction of all necessary video and non-video data to effect individual transition sub streams. The individual transition sub streams are then incorporated into a multi-program transition stream for subsequently concatenating the first multi-program stream A (440) and the second multi-program stream B (450).

Figure 4C:
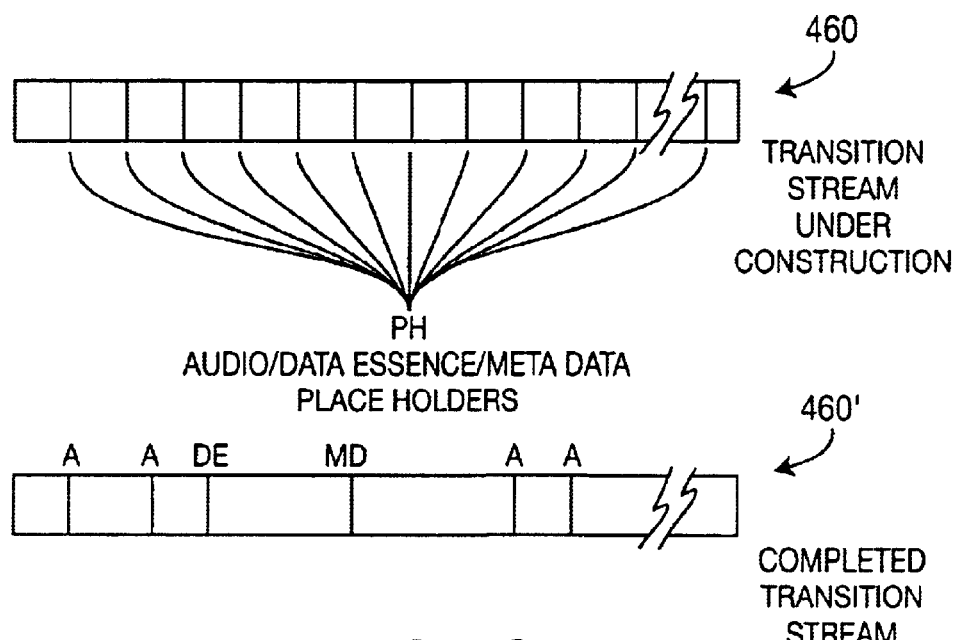

FIG. 4C depicts a graphical representation of a splicing operation useful in understanding the invention. Specifically, FIG. 4C depicts a reservation of non-video packet place holders within a transition stream under construction 460. That is, while forming a transition stream, it is likely that the step of encoding the decoded video frames from the frames being spliced is performed prior to the step of inserting non-video data into the partially formed transition stream. To ensure that the non-video data within the transition stream may be located proximate to the video data with which it is associated, placeholders are established during the video encoding process to allow for subsequent insertion of the non-video data within the transition stream. Specifically, as indicated in FIG. 4C, a plurality of audio, data essence and/or meta data place holders are inserted within a transition stream under construction. Upon completion of the transition stream, those place holders not utilized to store such non-video data are deleted and the resulting completed transition stream 460' is utilized as the transition stream.

Within the context of a multi program transport stream such as described above with respect to FIG. 4B, each of the transport sub streams being formed during the transition stream generation process utilizes a respective set of non-video data place holders. Each stream, upon completion, deletes or otherwise "de-utilizes" or releases the unused place holders (e.g., inserting NULL data) to form a completed transition stream.

The resulting transition stream or transition clip 430 comprises video information and non-video information from each of the streams A and B.

Figure 12:
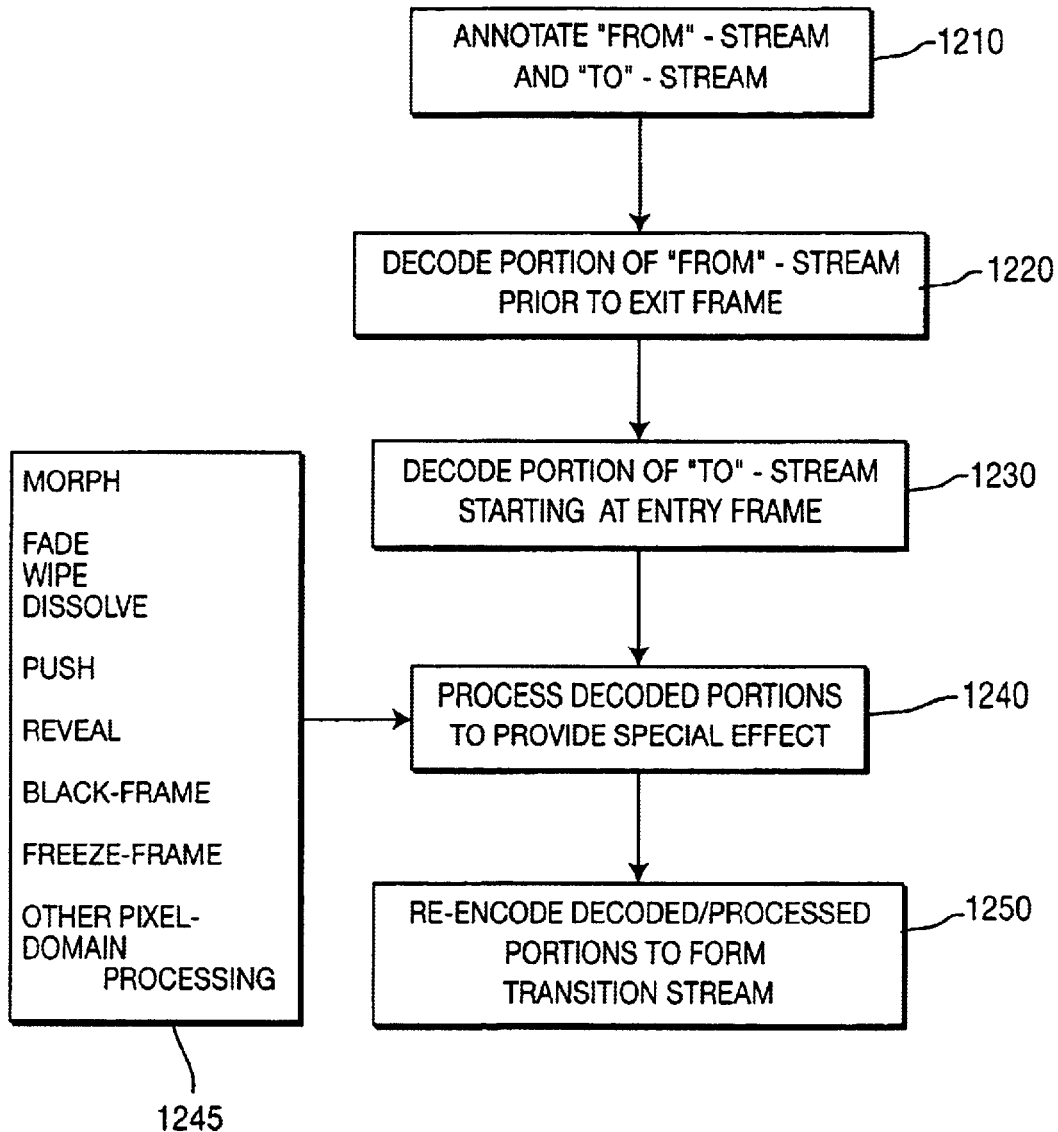
FIG. 12 depicts a flow diagram of a method for generating a transition stream or transition clip incorporating pixel domain effects.

FIG. 12 depicts a flow diagram of a method for generating a transition stream or transition clip incorporating pixel domain effects. Specifically, FIG. 12 depicts a flow diagram of a method 1200 suitable for use in the transition clip generation function 344 of the Play to air server 110 of FIG. 3.

The method 1200 is entered at step 1210, where a "from-stream" and "to-stream" are annotated. A method for annotating an information stream has previously been described with respect to FIG. 10. As previously noted, such annotation is not strictly necessary to practice the invention. However, the process of annotating, the streams is useful in efficiently processing the streams in subsequent processing steps or by other processing opponents. The method 1200 then proceeds to step 1220.

At step 1220 a portion of the from-stream prior to the exit frame is decoded, such as described above with respect to step 710 of the method 700 of FIG. 7. The method 1200 then proceeds to step 1230.

At step 1230 a portion of the to-stream beginning with the entry frame is decoded, such as described above with respect to step 715 of the method 700 of FIG. 7. The method 1200 then proceeds to step 1240.

At step 1240 the decoded portions of the from-stream and to-stream are subjected to one or more pixel domain processing steps to provide, for example, a special effect or other processing effect. The special effect provided at step 1240 may comprise one or more of the special effects noted in box 1240; namely, morphing, fade, wipe, dissolve, push, reveal, black-frame, freeze-frame or other well-known pixel domain processing effects. A morphing effect comprises a gradual (e.g., frame by frame) change from one shape into another. A wipe effect comprises a changing from one image to another image via intra-image regional changes, such as changing the location of a vertical bar delineating the first and second images from, for example, left to right or top to bottom. A fade or dissolve effect comprises a gradual fading or dissolving of a first image to reveal an second image underlying the first image. The underlying image may fade may also emerge in an manner opposite to the fading first image. A black (or blue) frame effect comprises the insertion of a monochrome frame(s) between two images. A "push" effect is in effect wherein an old image appears to slide off the screen as if it were being pushed by a new image sliding onto the screen. The old image and new image may be slid in any direction to produce this effect. A "reveal" effect is where an old image is removed to reveal an underlying new image. A reveal effect may comprise a "peal back" effect in which a "turned up corner," or a graphical representation of a turned up corner, reveals a portion of a new image underlying the old image. Upon selection of the new image, the old image is pealed back or otherwise removed from view beginning with the turned up corner portion to reveal the underlying new image.

A non-pixel domain effect for the meta-data domain may comprise a closed caption change at a sentence boundary. A non-pixel domain effect for the audio domain may comprise an audio fade from stream A audio, through silence, and back to audio information associated with stream B to form the spliced information stream.

The pixel domain processing step(s) may be used to provide artistic or interesting means of transitioning between video clips. For example, a caveat effect may be implemented in a 6 frame transition clip by transitioning from frame one to frame six via the four intervening frames including portions of frames one and six. While it is desirable to ensure that the pixel domain processing in part some form of transitional information to a viewer, such imparting of transitional information is not necessary. The method 1200 then proceeds to step 1250.

In one embodiment of the invention, the pixel domain process is performed with respect to a plurality of transport streams or other streams. Specifically, it is noted that the invention has been described above primarily within the context of two transport streams including at least image information being concatenated to produce a spliced transport stream including at least image information. During the generation of the transition stream or transition clip, the image information within the respective transport streams is decoded such that pixel domain information is available for processing by a pixel domain process. In one embodiment of the invention, additional pixel domain (or non-pixel domain) information is used during the pixel domain or non-pixel domain processing step. In a chroma-key processing example, a transport stream including a chroma-keying signal, herein denoted as a K-stream, includes video information having one or more chroma-keyed image regions. A first keyed image region within the K-stream may be indicated by a first color, while a second keyed image region of the K-stream may be indicated by a second color. The pixel domain information within the transition clip associated with the first keyed region is replaced by information from a first information source or information stream, while the pixel domain information within the transition clip associated with the second keyed region is replaced by information from a second information source or information stream. Thus, in the case of stream A comprising a K-stream having concatenated to it a stream B to form a transition stream, two additional information streams are used (denoted as region stream one and region stream two) to provide image information to replace the first and second keyed regions, respectively, of the K-stream. It will be appreciated by those skilled in the art that any number of regions may be utilized and that non-pixel information may also be divided into regions.

At step 1250, the decoded and processed video frames are re-encoded to form a transition stream. Step 1250 may be implemented in substantially the same manner as described above with respect to step 720 of the method 700 of FIG. 7.

Thus, the method 1200 of FIG. 12 provides, in addition to the generation of a transition stream or transition clip, the adaptation of video information within that transition stream or transition clip to an artistic or interesting visual purpose. In this manner, well-known pixel domain processing techniques may be used to impart a more realistic transitional impression to a viewer as the from-stream is exited and the to-stream is entered. It should be noted processing in non-video domains may also be performed on the non-video data discussed above with respect to FIGS. 4A–4C.

Thus, the utility of the present invention extends beyond the bare notion of pixel or image domain processing of only two image streams. Rather, the subject invention finds broad applicability where a plurality of information streams may be used to process pixel domain or other or non-video domain information within a transition stream being generated. In this manner, a transition stream or transition clip may be generated in response to many sources of information such that video and non-video information is merged with video and/or non-video information from more than the two streams forming a transition clip.

It should be noted that a transition clip or stream may be formed with a predetermined number of video frames. As such, in addition to the previously described VBV processing opportunities, the predetermined number of frames may be used to effect a particular pixel domain effect by selective encoding of portions of frames. For example, in a transition clip to have five video frames, each of the five frames may be divided into six intra-frame regions. The first frame includes ⅕ video data from the to-stream and ⅚ data from the from-stream; the second frame includes ⅖ data from the from-stream and ⅙ data from the to-stream and so on up to the fifth frame, which includes ⅙ data from the from-stream and ⅚ data from the to-stream. The inventors have determined that providing user-selectable (or predetermined) numbers of frames between 3 and 25 frames in a transition stream provides sufficient flexibility to enable most pixel domain processes and VBV buffer normalization functions.

Figure 13:
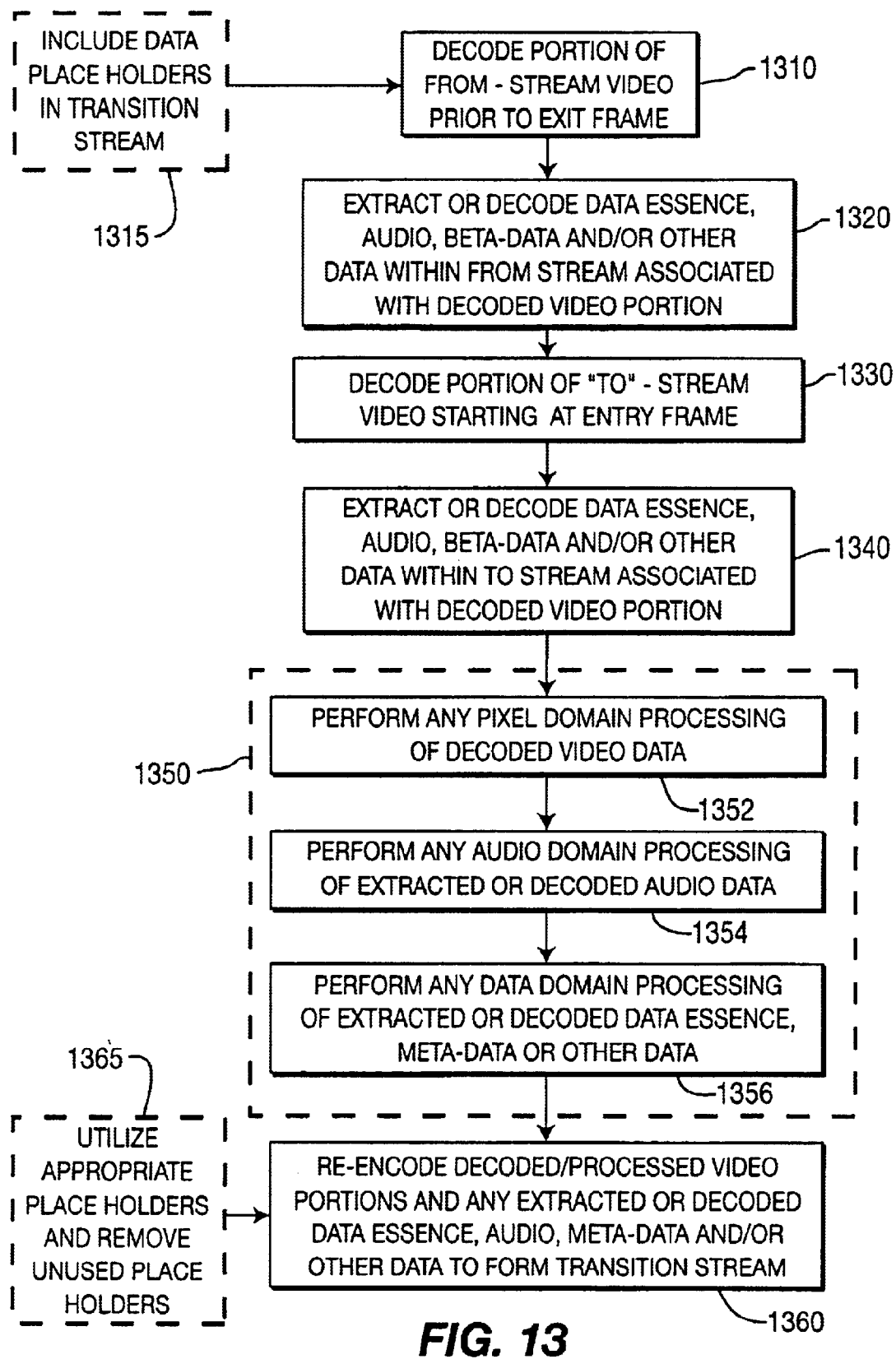
FIG. 13 depicts a flow diagram of a method for generating a transition stream or transition clip according to an embodiment of the invention.

FIG. 13 depicts a flow diagram of a method for generating a transition stream or transition clip according to an embodiment of the invention. Specifically, FIG. 13 depicts a flow diagram of a method 1300 suitable for use in the transition clip generation function 344 of the Play to air server 110 of FIG. 3.

The method 1300 is entered at step 1310 where an appropriate portion of the from-stream video prior to an exit frame is decoded. The method 1300 then proceeds to step 1320.

At step 1320, non-video information such as data essence, audio, meta-data and/or other data within the from-stream that is associated with the decoded video portion is extracted or decoded. That is, auxiliary or ancillary data, such as the aforementioned non-video data types, that are associated with the video frames within the from-stream decoded at step 1310 are extracted or decoded for subsequent use in the transition stream or transition clip.

At step 1330, an appropriate portion of the to-stream video beginning with an entry frame is decoded. The method 1300 then proceeds to step 1320.

At step 1340, non-video data associated with the video frames decoded at step 1330 is extracted or decoded. That is, data essence, audio, meta-data, and/or other data within the to-stream associated with the video frames decoded at step 1330 is extracted or decoded for subsequent use in the transition stream or transition clip. The method 1300 then proceeds to optional step 1350.

Step 1350, an optional processing step suitable for use on a partially formed transition stream or transition clip. Specifically, optional step 1350 includes three optional sub-steps which may be utilized independently or in any combination to effect a processing of the video data decoded at steps 1310 and 1330 or the non-video data extracted or decoded at steps 1320 and 1340.

A first optional sub step 1352 within optional step 1350 comprises the performance of any pixel domain processing of the decoded video data. That is, any of at least the pixel domain processing techniques described above with respect to steps 1240 and box 1245 of FIG. 12 may be used to process the to-stream and from-stream video information decoded at steps 1310 and 1330 respectively. The method 1300 then proceeds to step 1354.

At second optional sub-step 1354 or step 1350, any audio domain processing of the extracted or decoded audio data from steps 1320 and/or 1340 is performed. Such audio processing may include any of the known audio domain processing techniques used to impart, for example, a feeling of transition, or other audio impact upon a listener. The method 1300 then proceeds to step 1356.

At third optional sub-step 1356 of step 1350 any data domain processing of extracted or decoded data essence, meta-data or other data that was extracted or decoded at steps 1320 and/or 1340 is performed. Such data processing may include, for example, adjustments to meta-data or data essence based upon the pixel domain processing performed at step 1352. For example, if the meta data describes pixel domain properties of a transition clip video frame subjected to pixel domain processing, then the meta-data is processed to reflect the corresponding pixel domain processing. Other data processing functions may be implemented as well. The method 1300 then proceeds to step 1360.

At step 1360 the decoded and, optionally, processed video portions of the transition stream or clip are re-encoded. Additionally, any extracted or decoded data essence, audio, meta-data, and/or other data, including non-video data processed at step 1352–1356 are re-encoded according to the appropriate formats or inserted depending upon the data type. That is, the optionally processed video and non-video information produced by steps 1310–1350 is re-encoded or re-inserted into a transport stream format to form a transition clip or transition stream.

In an embodiment of the invention described above with respect to FIG. 4C, the transition stream to be formed comprises a transport stream or other stream in which a plurality of packets are used to represent the video and non-video data. In this embodiment of the invention, prior to forming a transition stream or transition clip, some portion of the available packets utilized to hold information are reserved for non-video data purposes. In this manner, the video information may be processed prior to the processing of any non-video information such that data place holders proximate the video frames may be interspersed among the video frames to include data relevant to those proximate video frames. Thus, in this embodiment of the invention an optional step 1350 is used to prior to step 1310 and the method 1300 of FIG. 13. Specifically, at step 1350 data place holders are included in the transition stream to be formed. That is, at step 1350 a portion of memory or plurality of packets intended to be used for the transition stream are interspersed with place holder information defining packets for non-video use. The method 1300 then proceeds through step 1310 to step 1360.

Step 1360, per box 1365, utilizes the appropriate place holders to store non-video information such as optionally processed audio, meta-data, data essence and/or other data related to the video frames. Upon completing the transition clip or upon processing all non-video information and locating such processed non-video information within appropriate place holders, unused place holders are removed or otherwise utilized for other purposes.

As previously noted, additional processing of the transition clip is used to ensure that the VBV of the from-and to-streams are accommodated in a manner providing for a substantially seamless splicing operation.

The invention has been primarily described within the context of splicing or concatenating two single program transport streams, i.e., transport streams containing a single audio-visual program, such as a movie, television show or commercial. However, those skilled in the art will appreciate that the invention provides frame accurate, seamless splicing between multi-program transport streams as well. To effect such a splice, the above-described methods are adapted to determine out-frames, in-frames and other appropriate parameters for each program within the multi-program transport streams.

Although various embodiments which incorporate the teachings of the present invention have been shown and described in detail herein, those skilled in the art can readily devise many other varied embodiments that still incorporate these teachings.

What is claimed is:

1. A method for generating a transition stream for transitioning from a first transport stream to a second transport stream in a substantially seamless manner, said method comprising the steps of:

decoding a portion of said first transport stream including at least a target out-frame representing a last image frame of said first transport stream to be presented;

decoding a portion of said second transport stream including at least a target in-frame representing a first image frame of said second transport stream to be presented;

processing, using a pixel domain process, at least one of said decoded image frames; and encoding a plurality of said decoded image frames, including said target out-frame and said target in-frame, to produce said transition stream.

2. The method of claim 1, wherein said pixel domain process comprises at least one of a morph, fade, wipe, dissolve, push, reveal, black-frame, freeze-frame and chroma-keying pixel domain process.

3. The method of claim 1, further comprising the steps of:
extracting, from said first and second transport streams, audio data associated with said video frames used to form said transition stream; and
inserting, into said transition stream, said extracted audio data.

4. The method of claim 1, further comprising the steps of:
extracting, from said first and second transport streams, non-video data associated with said video frames used to form said transition stream; and
inserting, into said transition stream, said extracted non-video data.

5. The method of claim 4, wherein said non-video data comprises at least one of audio data, meta-data, data essence, ancillary data and auxiliary data.

6. The method of claim 3, further comprising the step of:
processing, using an audio domain process, at least a portion of said extracted audio data.

7. The method of claim 4, further comprising the step of:
processing, using an non-video domain process, at least a portion of said extracted non-video data.

8. The method of claim 4, wherein said step of encoding said plurality of decoded image includes the step of transport encoded said encoded plurality of image frames, said method further comprising the steps of:
reserving a plurality of transport packets within said transition stream, said reserved packets not being utilized to store encoded image information;
utilizing at least a portion of said reserved plurality of transport packets to store said extracted audio data.

9. The method of claim 5, wherein said step of encoding said plurality of decoded image includes the step of transport encoded said encoded plurality of image frames, said method further comprising the steps of:
reserving a plurality of transport packets within said transition stream, said reserved packets not being utilized to store encoded image information;
utilizing at least a portion of said reserved plurality of transport packets to store said extracted non-video data.

10. The method of claim 4, wherein said first transport stream and said second transport stream are multiplexed into respective first and second multiple program transport streams, said method further comprising the step of:
determining, for each multiple program transport stream including a transport stream to be processed, a maximum extent of all image frames to be included in a transition stream; and
demultiplexing each multiple program transport stream to accommodate its respective determined maximum extent.

11. The method of claim 10, wherein said step of determining said image data extent includes the step of determining a maximum extent of all non-video data associated with image frames to be included in a transition stream, said maximum extent comprising a combination of the image data extent and the non-video data extent.

12. The method of claim 1, wherein first portion of said first transport stream to be decoded is determined according to the steps of:
decoding, in display order, said out-frame and all preceding frames from said out-frame to a prior I-frame;
in the case of said out-frame comprising a B-frame, defining the frame immediately preceding said prior I-frame in transmission order as a final first transport stream frame in said transition stream;
in the case of said out-frame not comprising a B-frame, defining said out-frame as said final first transport stream frame in said transition stream.

13. The method of claim 1, wherein said first portion of said second transport stream to be decoded is determined according to the steps of:
decoding, in display order, said in-frame and all non-I-frames following said in-frame up to a next I-frame.

14. The method of claim 1, further comprising the step of indexing each of said first and second transport streams, said step of indexing comprising the steps of:
parsing a transport layer of a stream to be indexed to identify packets associated with at least one of sequence headers, picture headers and predefined splicing syntax;
determining, for each frame in said stream to be indexed, at least one of a picture number, a picture coding type, a start of frame transport packet number, an end of frame transport packet number, a presentation time stamp (PTS) and a decode time stamp (DTS).

15. The method of claim 4, wherein said determinations for each frame are stored in a meta file for subsequent use in generating a transition stream.

16. The method of claim 1, wherein each of said first and second transport streams are associated with a respective video buffering verifier (VBV) parameter, said method further comprising the step of:
determining if a difference exists between said from-stream VBV parameter and said to-stream VBV parameter; and
adapting, in response to said determination, step of re-encoding.

17. The method of claim 16, wherein said step of adapting comprises the steps of:
increasing a rate control bit allocation in response to a determination that said from-stream VBV parameter exceeds said to-stream VBV parameter by a first threshold level; and
decreasing said rate control bit allocation in response to a determination that said to-stream VBV parameter exceeds said from-stream VBV parameter by a second threshold level.

18. A method for generating a transition stream for transitioning from a first transport stream to a second transport stream in a substantially seamless manner, said method comprising the steps of:
decoding a portion of said first transport stream including at least a target out-frame representing a last image frame of said first transport stream to be presented, said decoded portion including non-video data associated with at least one decoded image frame of said first transport stream;
decoding a portion of said second transport stream including at least a target in-frame representing a first image frame of said second transport stream to be presented, said decoded portion including non-video data associated with at least one decoded image frame of said second transport stream;
encoding a plurality of said decoded image frames, including said target out-frame and said target in-frame, to produce said transition stream; and inserting, into said transition stream, said extracted non-video data.

19. The method of claim 18, wherein said non-video data comprises at least one of audio data, meta-data, data essence, ancillary data and auxiliary data.

20. The method of claim 18, further comprising the step of:

processing, using a pixel domain process, at least a portion of said extracted audio data.

21. The method of claim 20, wherein said pixel domain processing comprises at least one of a morph, fade, wipe, dissolve, push, reveal, black-frame and freeze-frame pixel domain process.

22. The method of claim 18, further comprising the step of:

processing, using an non-video domain process, at least a portion of said extracted non-video data.

23. The method of claim 18, wherein said step of encoding said plurality of decoded image includes the step of transport encoded said encoded plurality of image frames, said method further comprising the steps of:

reserving a plurality of transport packets within said transition stream, said reserved packets not being utilized to store encoded image information;

utilizing at least a portion of said reserved plurality of transport packets to store said extracted non-video data.

24. The method of claim 18, wherein said generated transition stream is constrained to a pre-determined number of image frames.

25. The method of claim 18, wherein each of said first and second transport streams are associated with a respective video buffering verifier (VBV) parameter, said method further comprising the step of:

determining if a difference exists between said from-stream VBV parameter and said to-stream VBV parameter; and adapting, in response to said determination, step of re-encoding.

26. The method of claim 25, wherein said step of adapting comprises the steps of:

increasing a rate control bit allocation in response to a determination that said from-stream VBV parameter exceeds said to-stream VBV parameter by a first threshold level; and decreasing said rate control bit allocation in response to a determination that said to-stream VBV parameter exceeds said from-stream VBV parameter by a second threshold level.

* * * * *